US011103041B2

(12) United States Patent
Walia et al.

(10) Patent No.: US 11,103,041 B2
(45) Date of Patent: Aug. 31, 2021

(54) SYSTEMS AND METHODS OF ADAPTIVE NAIL PRINTING AND COLLABORATIVE BEAUTY PLATFORM HOSTING

(71) Applicant: Preemadonna Inc., New York, NY (US)

(72) Inventors: Herpreet Walia, Sunnyvale, CA (US); Casey Schulz, San Jose, CA (US); Christina Trampota, New York, NY (US)

(73) Assignee: Preemadonna Inc., Sunnyvale, CA (US)

( * ) Notice: Subject to any disclaimer, the term of this patent is extended or adjusted under 35 U.S.C. 154(b) by 0 days.

(21) Appl. No.: 16/246,517

(22) Filed: Jan. 13, 2019

(65) Prior Publication Data

US 2019/0239616 A1   Aug. 8, 2019

Related U.S. Application Data

(63) Continuation of application No. PCT/US2018/054217, filed on Oct. 3, 2018.
(Continued)

(51) Int. Cl.
*B41J 3/407* (2006.01)
*A45D 29/14* (2006.01)
(Continued)

(52) U.S. Cl.
CPC ............. *A45D 29/14* (2013.01); *A45D 29/00* (2013.01); *B41J 3/407* (2013.01); *B41J 3/4073* (2013.01);
(Continued)

(58) Field of Classification Search
CPC ... A45D 2029/005; B41J 3/407; B41J 3/4071; B41J 3/4073; B41J 3/543
(Continued)

(56) References Cited

U.S. PATENT DOCUMENTS 1,844,698 A   2/1932  Snyder
2,461,695 A   2/1949  McMahon
(Continued)

FOREIGN PATENT DOCUMENTS

CA   2955640   1/2016
CA   3044997   1/2016
(Continued)

OTHER PUBLICATIONS

English language translation of JP 2013-192681A, publication date Sep. 30, 2013. (Year: 2013).*
(Continued)

*Primary Examiner* — Leslie J Evanisko
(74) *Attorney, Agent, or Firm* — London Bridge Ventures

(57) ABSTRACT

Systems and methods of adaptive nail printing and collaborative beauty platform hosting are disclosed. In one aspect, embodiments of the present disclosure include a method, which may be implemented on a system, to decorate a physical target. The method can further include determining a size of the physical target and adapting dimensions of the design to the size of the physical target. In a further embodiment, the design having the dimensions that have been adapted on to the physical target is printed. Moreover, content can be depicted while printing the design onto the physical target to decorate the physical target.

20 Claims, 18 Drawing Sheets

Related U.S. Application Data

(60) Provisional application No. 62/567,808, filed on Oct. 4, 2017.

(51) Int. Cl.
 A45D 29/00 (2006.01)
 B41J 3/46 (2006.01)
 B41J 11/00 (2006.01)

(52) U.S. Cl.
 CPC ............... B41J 3/46 (2013.01); B41J 11/008 (2013.01); *A45D 2029/005* (2013.01)

(58) Field of Classification Search
 USPC .......................................................... 132/200
 See application file for complete search history.

(56) References Cited

U.S. PATENT DOCUMENTS

| | | | |
|---|---|---|---|
| 3,130,734 A | 4/1964 | Ellis et al. | |
| D277,323 S | 1/1985 | Raicevic | |
| D299,559 S | 1/1989 | Wong | |
| 4,864,966 A | 9/1989 | Anderson et al. | |
| 4,910,661 A | 3/1990 | Barth et al. | |
| 4,915,331 A | 4/1990 | Becker et al. | |
| 4,937,676 A | 6/1990 | Finelli et al. | |
| 5,668,930 A | 9/1997 | Hamura et al. | |
| 5,746,334 A | 5/1998 | Brandenberg | |
| 5,860,363 A | 1/1999 | Childers | |
| 5,906,284 A | 5/1999 | Hammerstrom | |
| 5,931,166 A | 8/1999 | Weber | |
| 6,035,860 A | 3/2000 | Mombourquette | |
| 6,067,996 A | 5/2000 | Pearl | |
| 6,229,565 B1 | 5/2001 | Bobry | |
| 6,286,517 B1 | 9/2001 | Weber et al. | |
| 6,336,694 B1 | 1/2002 | Ishizaka | |
| 6,525,724 B1 | 2/2003 | Takami | |
| D476,509 S | 7/2003 | Orsino et al. | |
| 6,585,342 B1* | 7/2003 | Mantell | B41J 2/2132 347/14 |
| 6,738,903 B1 | 5/2004 | Haines | |
| 6,919,927 B1 | 7/2005 | Hyodo | |
| 6,940,541 B1 | 9/2005 | Small | |
| 6,986,442 B2 | 1/2006 | Engel et al. | |
| 7,123,983 B2 | 10/2006 | Yogo et al. | |
| 7,193,734 B2 | 3/2007 | Silverbrook et al. | |
| 7,246,780 B2 | 7/2007 | Oddsen | |
| 7,290,550 B2 | 11/2007 | Sim | |
| 7,450,105 B2 | 11/2008 | Nakamura | |
| 7,798,061 B2 | 9/2010 | Dilou | |
| 8,262,053 B1 | 9/2012 | Zhao | |
| D686,369 S | 7/2013 | Horvath | |
| 8,646,898 B2 | 2/2014 | Bitoh | |
| 8,681,359 B2 | 3/2014 | Bitoh | |
| 8,695,495 B2 | 4/2014 | Hashimoto | |
| D705,488 S | 5/2014 | Cheng | |
| 8,840,206 B2 | 9/2014 | Hashimoto | |
| 8,919,898 B2 | 12/2014 | Yamasaki | |
| 8,928,607 B1 | 1/2015 | Spackman | |
| 9,357,825 B2 | 6/2016 | Yamasaki | |
| 9,462,869 B2 | 10/2016 | Bitoh | |
| 9,475,308 B2 | 10/2016 | Legallais | |
| 9,486,050 B2 | 11/2016 | Yamasaki | |
| 9,510,658 B2 | 12/2016 | Nagao | |
| 9,526,313 B2 | 12/2016 | Asako | |
| 9,603,431 B2 | 3/2017 | Nagao | |
| 9,635,923 B2 | 5/2017 | Bitoh | |
| 9,642,436 B2 | 5/2017 | Miyamoto | |
| 9,675,159 B2 | 6/2017 | Bitoh | |
| 9,687,059 B2 | 6/2017 | Walia | |
| 9,712,727 B2 | 7/2017 | Yamasaki | |
| 9,743,740 B2 | 8/2017 | Teshima | |
| 9,799,116 B2 | 10/2017 | Kafuku | |
| 9,808,068 B2 | 11/2017 | Yamasaki | |
| 9,820,547 B2 | 11/2017 | Yamasaki | |
| 9,888,759 B2 | 2/2018 | Asako | |
| 9,889,692 B2 | 2/2018 | Legallais | |
| 9,894,976 B2 | 2/2018 | Shimizu | |
| 9,894,978 B2 | 2/2018 | Nagao | |
| 9,901,156 B2 | 2/2018 | Nagao | |
| 9,930,951 B2 | 4/2018 | Nagao | |
| 9,943,154 B2 | 4/2018 | Teshima | |
| 9,943,155 B2 | 4/2018 | Hori | |
| 9,955,764 B2 | 5/2018 | Yoshigai | |
| 10,022,984 B2 | 7/2018 | Irie | |
| 10,029,477 B2 | 7/2018 | Yamazaki | |
| 10,130,154 B2 | 11/2018 | Irie | |
| 10,149,526 B2 | 12/2018 | Nagao | |
| 10,278,472 B2 | 5/2019 | Yamazaki | |
| 10,292,475 B2 | 5/2019 | Yamazaki | |
| 10,404,890 B2 | 9/2019 | Cao | |
| 10,470,546 B2 | 11/2019 | Walia | |
| 10,477,937 B2 | 11/2019 | Walia | |
| 10,653,225 B2 | 5/2020 | Walia | |
| 2003/0041871 A1 | 3/2003 | Endo | |
| 2003/0217758 A1 | 11/2003 | Mesirow | |
| 2004/0056958 A1 | 3/2004 | Lee | |
| 2004/0094176 A1 | 5/2004 | Daoting | |
| 2005/0041018 A1 | 2/2005 | Philipp | |
| 2005/0088495 A1 | 4/2005 | Chan | |
| 2005/0150508 A1 | 7/2005 | Downs | |
| 2005/0174367 A1 | 8/2005 | Kondo | |
| 2005/0219284 A1 | 10/2005 | Shima | |
| 2006/0044345 A1* | 3/2006 | Jones | B41J 2/145 347/37 |
| 2006/0087686 A1 | 4/2006 | Anderson | |
| 2006/0140647 A1 | 6/2006 | Adkins | |
| 2006/0204250 A1 | 9/2006 | Ishihara | |
| 2007/0050207 A1 | 3/2007 | Merszei | |
| 2007/0092634 A1 | 4/2007 | Zhang | |
| 2008/0193154 A1 | 8/2008 | Yamada | |
| 2008/0219528 A1 | 9/2008 | Edgar | |
| 2008/0308687 A1 | 12/2008 | Terry | |
| 2009/0092310 A1 | 4/2009 | Gifford | |
| 2009/0153604 A1 | 6/2009 | Chen et al. | |
| 2009/0277470 A1 | 11/2009 | Mitchell et al. | |
| 2010/0053151 A1 | 3/2010 | Marti et al. | |
| 2010/0091104 A1 | 4/2010 | Sprigle et al. | |
| 2010/0123756 A1 | 5/2010 | Yamada | |
| 2011/0228289 A1 | 9/2011 | Yamamoto | |
| 2012/0048880 A1 | 3/2012 | Damolaris | |
| 2012/0066079 A1 | 3/2012 | Falzone | |
| 2012/0103210 A1* | 5/2012 | Hashimoto | B41J 3/407 101/35 |
| 2012/0113171 A1 | 5/2012 | Murata | |
| 2012/0147113 A1 | 6/2012 | Yamasaki | |
| 2012/0170293 A1 | 7/2012 | Terry | |
| 2012/0224068 A1 | 9/2012 | Sweet | |
| 2012/0274683 A1 | 11/2012 | Yamasaki | |
| 2012/0281080 A1 | 11/2012 | Wang | |
| 2012/0287183 A1 | 11/2012 | Bitoh | |
| 2012/0287192 A1 | 11/2012 | Yamasaki | |
| 2013/0019799 A1 | 1/2013 | Bitoh | |
| 2013/0038647 A1 | 2/2013 | Hashimoto | |
| 2013/0038648 A1 | 2/2013 | Kasahara | |
| 2013/0057581 A1 | 3/2013 | Meier | |
| 2013/0083098 A1* | 4/2013 | Yamasaki | A45D 29/00 347/5 |
| 2013/0106928 A1 | 5/2013 | Lee | |
| 2013/0106970 A1 | 5/2013 | Yamasaki | |
| 2013/0175413 A1 | 7/2013 | Waugh | |
| 2013/0216295 A1 | 8/2013 | Wong | |
| 2013/0235137 A1 | 9/2013 | Nakayama | |
| 2013/0242019 A1 | 9/2013 | Bitoh | |
| 2013/0274907 A1 | 10/2013 | Carbonera et al. | |
| 2013/0298926 A1 | 11/2013 | Smeragliuolo | |
| 2014/0060560 A1 | 3/2014 | Bitoh et al. | |
| 2014/0070059 A1 | 3/2014 | Vieira | |
| 2014/0132968 A1 | 5/2014 | Bitoh et al. | |
| 2014/0156459 A1 | 6/2014 | Zises | |
| 2014/0161507 A1 | 6/2014 | Wong | |
| 2014/0300722 A1 | 10/2014 | Garcia | |
| 2015/0007841 A1 | 1/2015 | Yamasaki | |
| 2015/0029382 A1 | 1/2015 | Chun et al. | |

(56) References Cited

U.S. PATENT DOCUMENTS

| | | | |
|---|---|---|---|
| 2015/0062216 A1 | 3/2015 | Yamasaki | |
| 2015/0138385 A1 | 5/2015 | Kim | |
| 2015/0182001 A1 | 7/2015 | Yi | |
| 2015/0335131 A1 | 11/2015 | Ortiz | |
| 2016/0052295 A1 | 2/2016 | Legallais | |
| 2016/0125624 A1 | 5/2016 | Liu | |
| 2016/0183657 A1 | 6/2016 | Nagao | |
| 2016/0345708 A1 | 12/2016 | Walia et al. | |
| 2016/0353858 A1 | 12/2016 | Melul | |
| 2016/0353859 A1 | 12/2016 | Melul | |
| 2017/0036456 A1 | 2/2017 | Legallais | |
| 2017/0072702 A1* | 3/2017 | Collett | B41J 3/407 |
| 2017/0215550 A1 | 8/2017 | Walia et al. | |
| 2017/0347770 A1 | 12/2017 | Walia et al. | |
| 2018/0255902 A1 | 9/2018 | Walia et al. | |
| 2018/0255903 A1 | 9/2018 | Walia et al. | |
| 2018/0263356 A1 | 9/2018 | Cao | |
| 2019/0166972 A1 | 6/2019 | Walia | |
| 2019/0239616 A1 | 8/2019 | Walia | |
| 2020/0315316 A1 | 10/2020 | Walia | |

FOREIGN PATENT DOCUMENTS

| | | | |
|---|---|---|---|
| CA | 2955640 C | 10/2019 | |
| CN | 102555529 | 7/2012 | |
| CN | 102886983 | 1/2013 | |
| CN | 102922880 | 2/2013 | |
| CN | 102948994 | 3/2013 | |
| CN | 106998870 | 8/2017 | |
| EP | 1204340 | 5/2002 | |
| EP | 2740386 | 6/2014 | |
| EP | 3179880 A1 | 6/2017 | |
| EP | 3222432 | 9/2017 | |
| EP | 3179880 B1 | 9/2020 | |
| GB | 2546672 | 7/2017 | |
| GB | 2563766 | 12/2018 | |
| GB | 2546672 B | 1/2019 | |
| GB | 2563766 B | 3/2019 | |
| JP | 2000006384 | 1/2000 | |
| JP | 2003-534083 A | 11/2003 | |
| JP | 2002165632 | 1/2004 | |
| JP | 2009029092 | 2/2009 | |
| JP | 2012085944 | 5/2012 | |
| JP | 2013039169 A * | 2/2013 | |
| JP | 2013142881 | 7/2013 | |
| JP | 2013192681 | 9/2013 | |
| JP | 2013192681 A * | 9/2013 | |
| JP | 201464892 | 4/2014 | |
| JP | 2014113445 | 6/2014 | |
| JP | 2014171699 | 9/2014 | |
| JP | 2017521225 | 8/2017 | |
| JP | 2020116436 | 8/2020 | |
| WO | WO99/33372 | 12/1998 | |
| WO | WO0191598 | 12/2001 | |
| WO | WO 2014091411 | 6/2014 | |
| WO | WO2015018987 | 2/2015 | |
| WO | WO201501696 | 7/2015 | |
| WO | WO2015132734 | 9/2015 | |
| WO | WO2016014132 | 1/2016 | |

OTHER PUBLICATIONS

English language translation of JP 2013/039169 A, publication date Feb. 28, 2013. (Year: 2013).*
GB Exam report GB Application No. 1814292.7, Applicant: Preemadonna Inc., dated Dec. 18, 2018, 2 pages.
EPO EESR and Search Opinion EP Application No. 15824530.8, Applicant: Preemadonna Inc., dated Oct. 4, 2018, 9 pages.
International Search Report & Written Opinion for Application No. PCT/US2018/054217, Date of filing: Oct. 3, 2018, Applicant: Preemadonna Inc. dated Feb. 11, 2019, 11 pages.
International Search Report & Written Opinion for Application No. PCT/US2015/027851, Date of filing: Apr. 17, 2015, Applicant: Preemadonna Inc. dated Oct. 28, 2015, 18 pages.
Google Internet search for 'nail printing machine' date restricted prior to Apr. 26, 2014, 4 pages.
GB Exam report GB Application No. 1706383.5, Applicant: Preemadonna Inc., dated Jan. 8, 2018, 4 pages.
Lee, Hanna, On My mind: It is a Social Burden?, Jun. 13, 2012, NAILS Magazine (2013).
Translation of WO2015-018987 Retrieved from patent scope.
JP Exam report JP Application No. 2017-525507 Applicant: Preemadonna Inc., dated May 8, 2019, 8 pages.
CA Exam report CA Application No. 2955640 Applicant: Preemadonna Inc., dated Feb. 20, 2019, 5 pages.
CA Exam report CA Application No. 2955640 Applicant: Preemadonna Inc., dated Apr. 30, 2019, 4 pages.
JP Final Rejection, JP Application No. 2017-525507 Applicant: Preemadonna Inc., dated Jan. 6, 2020, 4 pages.
EP Rule 71.3 communication, European (EP) Patent Application No. 15824530.8, Applicant: Preemadonna Inc., dated Apr. 14, 2020, 52 pages.
CNIPA Notification of Unity restoration fee, CN Application No. 201580051357.5; Applicant: Preemadonna Inc., dated Mar. 23, 2020, 2 pages.
CNIPA Office action, CN Application No. 201580051357.5; Applicant: Preemadonna Inc., dated May 28, 2020, 2 pages.
CNIPA Office action, CN Application No. 201580051357.5; Applicant: Preemadonna Inc., dated May 28, 2020, 2 pages (English Translation).
EP Decision to Grant, European (EP) Patent Application No. 15824530.8, Applicant: Preemadonna Inc., dated Sep. 34, 2020, 2 pages.
CNIPA Office action, CN Application No. 201580051357.5; Applicant: Preemadonna Inc., dated Mar. 11, 2021 2 pages. (English translation).
CA Exam report CA Application No. 3,044,997 Applicant: Preemadonna Inc., dated Feb. 16, 2021, 4 pages.
JP Exam report JP Application No. 2020-081758 Applicant: Preemadonna Inc., dated Apr. 20, 2021, 5 pages, (english translation).
CNIPA supplemental search, CN Application No. 201 580051357.5; Applicant: Preemadonna Inc., dated May 11, 2021, 1 page (English Translation).
CNIPA Grant Notice, CN Application No. 201580051357.5; Applicant: Preemadonna Inc., dated May 19, 2021, 1 page (English Translation).

* cited by examiner

SYSTEMS AND METHODS OF ADAPTIVE NAIL PRINTING AND COLLABORATIVE BEAUTY PLATFORM HOSTING

CLAIM OF PRIORITY

This application is a Continuation application of:
International Application No. PCT/US18/54217, filed Oct. 3, 2018 and entitled "Systems and Methods Of Adaptive Nail Printing and Collaborative Beauty Platform Hosting," (8007.WO01) which claims the benefit of:
U.S. Provisional Application No. 62/567,808, filed Oct. 4, 2017 and entitled "Methods And Apparatuses For Automatically Painting Or Decorating Of Targets Of Varying Surface Areas and/or Curvature Using Computer Vision And Systems Thereof For Content Management That Is Third Party Integrable," (8007.US00), the contents of which are incorporated by reference in their entireties.

TECHNICAL FIELD

The disclosed technology relates generally to methods and apparatuses for automatically painting or decorating of targets of varying surface areas and/or curvature using computer vision. Embodiments of the present disclosure further include systems thereof for content management that is third party integrable.

BACKGROUND

In decorating nails or painting other targets, it may take many minutes from the process of connecting a device, sizing a target, scaling art to fit the target, downloading art, and processing art to print and then printing that art depending upon resolution settings. Often a user moves the target, causing the print to be skewed or flawed. This can be a concern when the user is a child, pre-teen or teen user— where fine motor skills are not yet fully developed.

DETAILED DESCRIPTION

Figure 1:
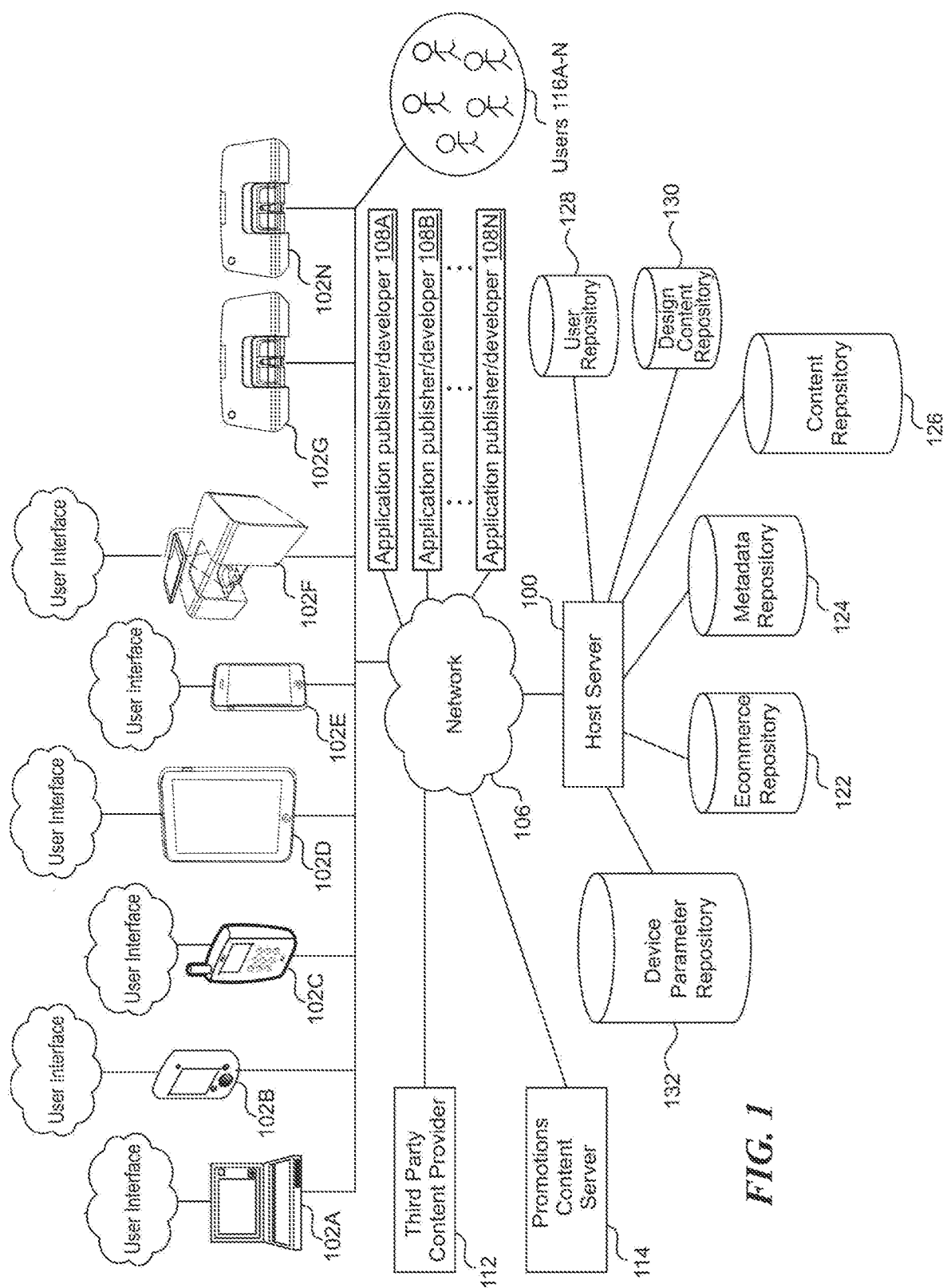
FIG. 1 illustrates an example block diagram of a host server able to facilitate adaptive nail printing and host a collaborative beauty platform, in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems, methods and apparatuses of platforms (e.g., as hosted by the host server 100 as depicted in the example of FIG. 1) for adaptive printing of physical targets and automatic sizing adjustment. In general, the machine (e.g., a machine can be one or more of, client device 102A-N of FIG. 1, client device 402 of FIG. 4A or server 100 of FIG. 1, server 300 of FIG. 3A) can further provide for or host a collaborative beauty platform and/or a commerce environment.

FIG. 1 illustrates an example block diagram of a host server 100 able to facilitate adaptive nail printing and host a collaborative beauty platform, in accordance with embodiments of the present disclosure.

The client devices 102A-N (or user devices) can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102A-N can include a painting apparatus, a nail painting apparatus, a decorating apparatus, a mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, a wearable device and/or any other portable, mobile, hand held devices, etc. The input mechanism on client devices 102A-N can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), eye tracking, eye detection, pupil tracking/detection, voice, audio, gesture, or a combination of the above.

The client devices 102A-N, application publisher/developer 108A-N, its respective networks of users, a third party content provider 112, and/or promotional content server 114, can be coupled to the network 106 and/or multiple networks. In some embodiments, the devices 102A-N and host server 100 may be directly connected to one another. In one embodiment, the host server 100 is operable to facilitate adaptive nail printing (e.g., as via a decorating apparatus or device shown as user devices 102A-N). The host server 100 can further deploy a collaborative beauty platform for presentation to or access by a user 116A-N via a user device 102A-N.

Figure 3A:
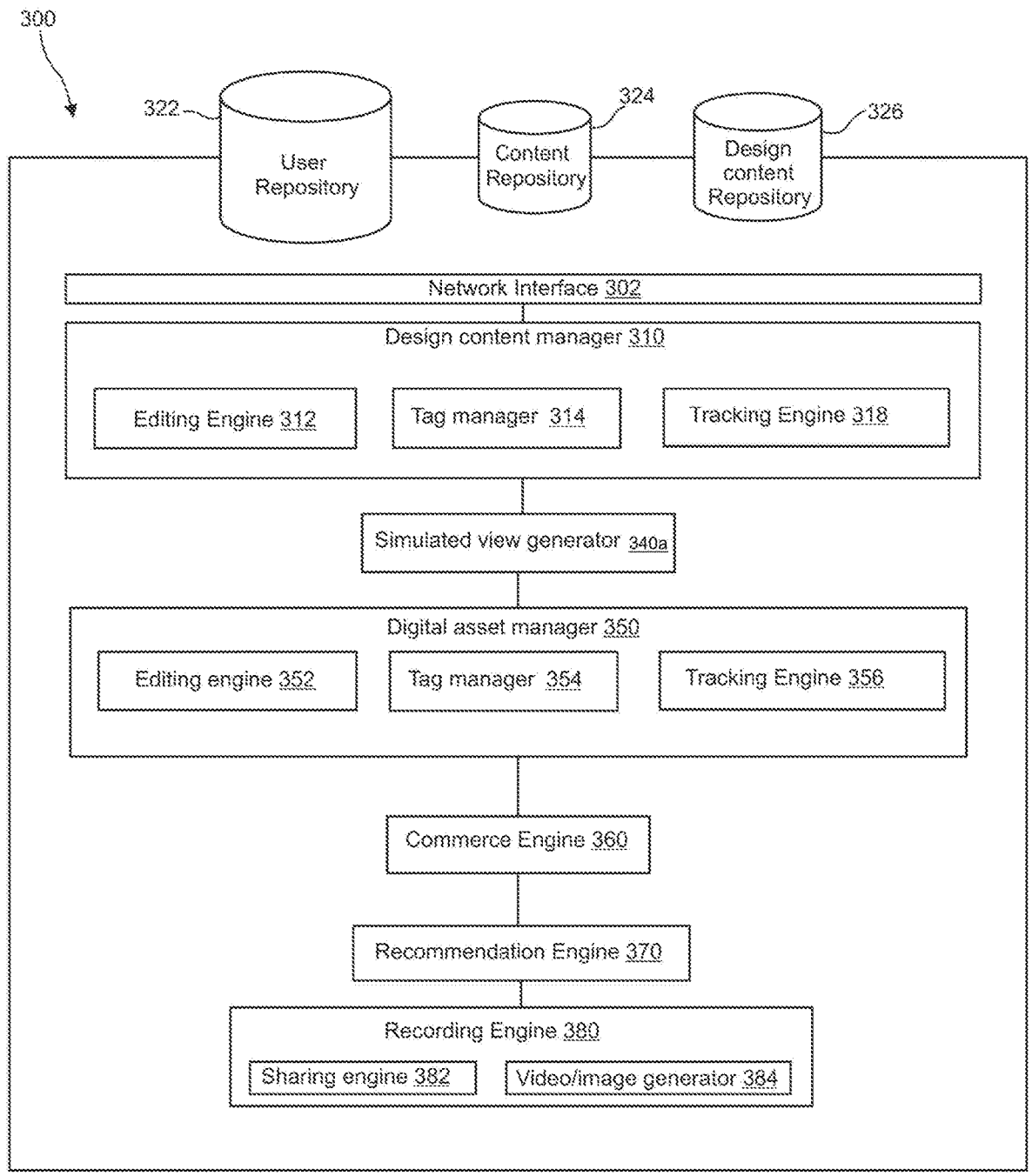
FIG. 3A depicts an example functional block diagram of a host server that facilitates adaptive nail printing and hosts a collaborative beauty platform, in accordance with embodiments of the present disclosure.
Figure 3B:
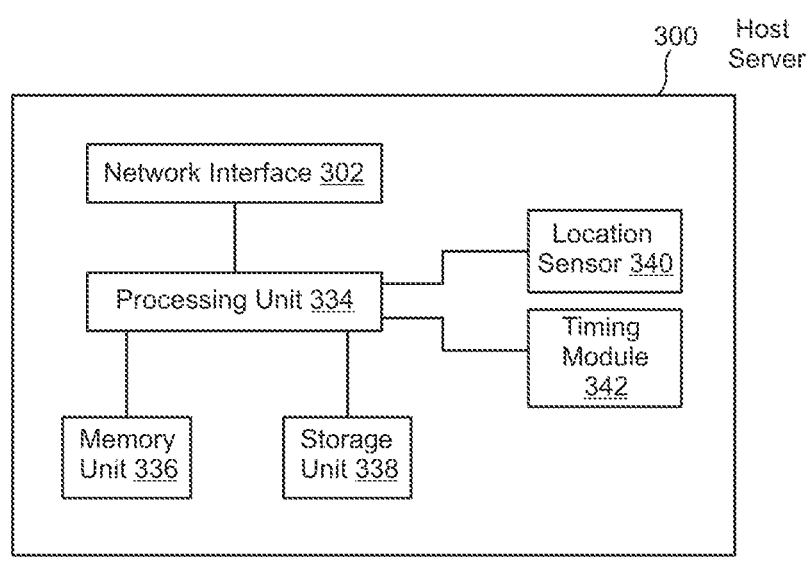
FIG. 3B depicts an example block diagram illustrating the components of the host server that is able to facilitate adaptive nail printing and host a collaborative beauty platform, in accordance with embodiments of the present disclosure

Functions and techniques performed by the host server 100 and the components therein are described in detail with further references to the examples of FIG. 3A-3B.

In general, network 106, over which the client devices 102A-N, the host server 100, and/or various application publisher/provider 108A-N, content server/provider 112, and/or promotional content server 114 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N and the host server 100 and may appear as one or more networks to the serviced systems and devices. In one embodiment, communications to and from the client devices 102A-N can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 5G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a design content repository 130, a content repository 126, a metadata repository 124, an e-commerce repository 122 and/or a device parameter repository 132. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to generate, create and/or provide data to be stored in the user repository 128, the design content repository 130, the content repository 126, the metadata repository 124, the ecommerce repository 122 and/or the device parameter repository 132. The user repository 128 can store user information, user profile information, demographics information, analytics, statistics regarding human users, user interaction, brands advertisers, art selection, devices used or owned by a user, device usage statistics, platform use/access frequencies, user preferences of design or art, membership type or membership level, user generated content such as art of designs created by users, etc.

The design content repository 130 can store design content, art, prints, colors, patterns which can be used in decorating or painting targets. The design content repository 130 can also include data which can be used to generate (e.g., generated in part or in whole by the host server 100 and/or locally at a client device 102A-N) art, design, stickers, prints, colors and/or patterns.

Similarly, the ecommerce repository 122 can store a listing of merchandise or consumables relating to decoration or painting of physical targets, including applicator or ink replacement, nail polish consumables, nail color remover wipes, cosmetic wipes, other beauty products, etc.

The content repository 126 can store media or other interactive content including ads, promotions, sponsored content provided by a third party content provider 112, a promotions content server 114 and/or the application publisher 108. The media or other interactive content can be provided during nail printing by user devices 102 and/or provided in the collaborative beauty platform hosted by host server 100.

The device parameter repository 132 can store settings, device IDs, device type, user type and/or configuration data of user devices 102. The metadata repository 124 is able to store tags, tag statistics, tag parameters, metadata, metadata statistics for media or other interactive content.

Figure 2A:
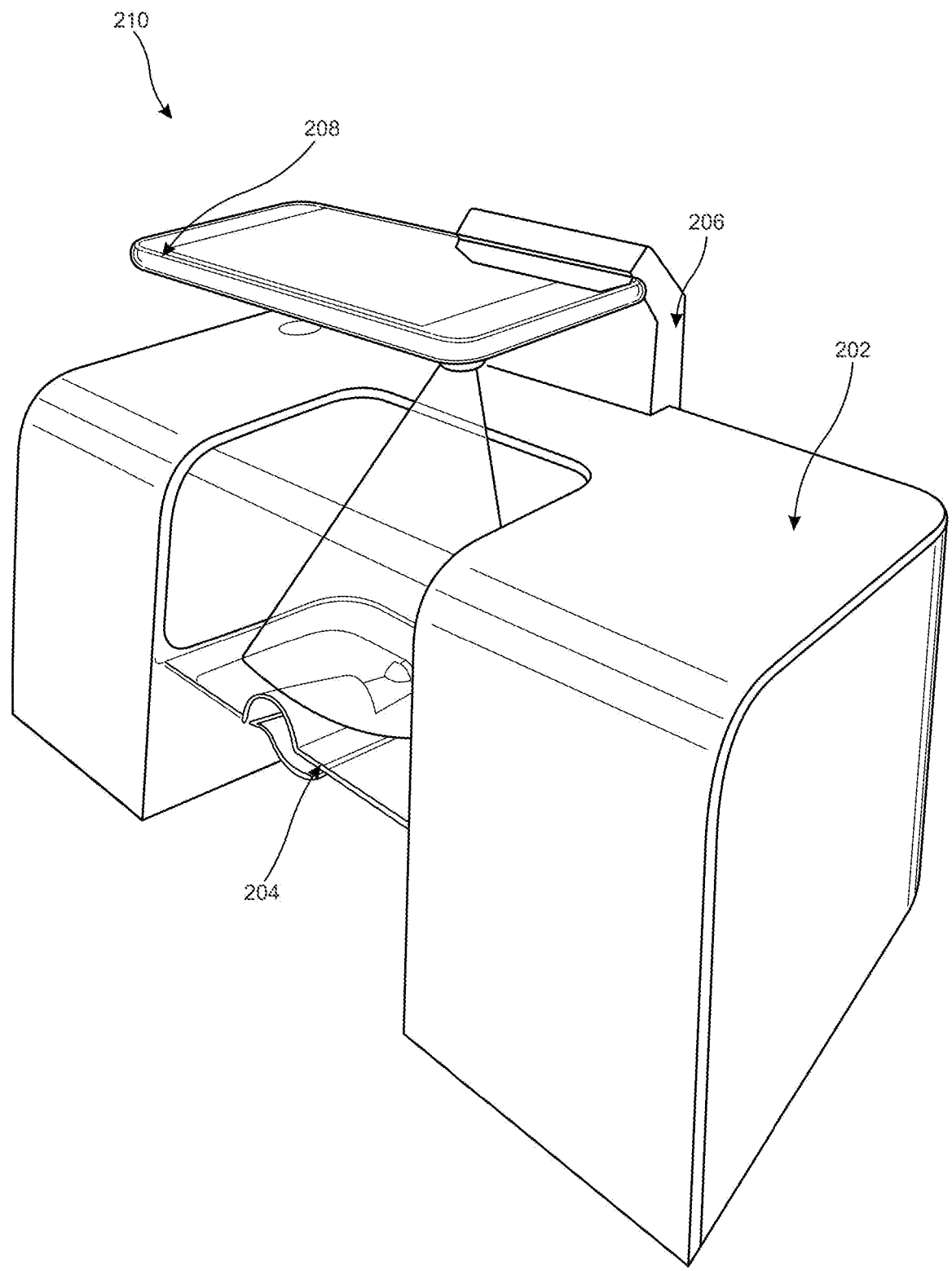
FIG. 2A-2C depict multiple views of an example apparatus to paint or decorate physical targets of varying surface areas or curvature, in accordance with embodiments of the present disclosure.
Figure 2B:
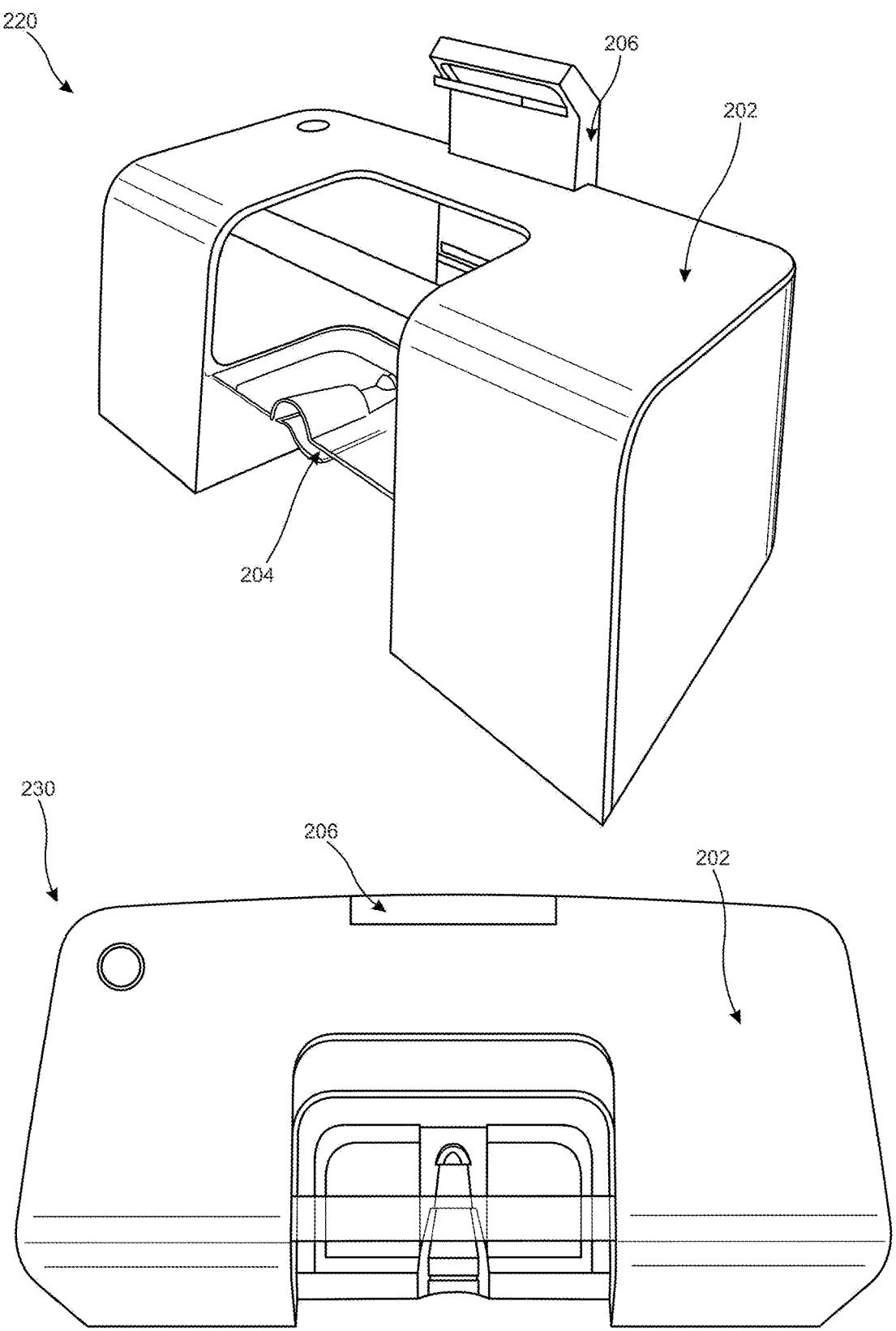
Figure 2C:
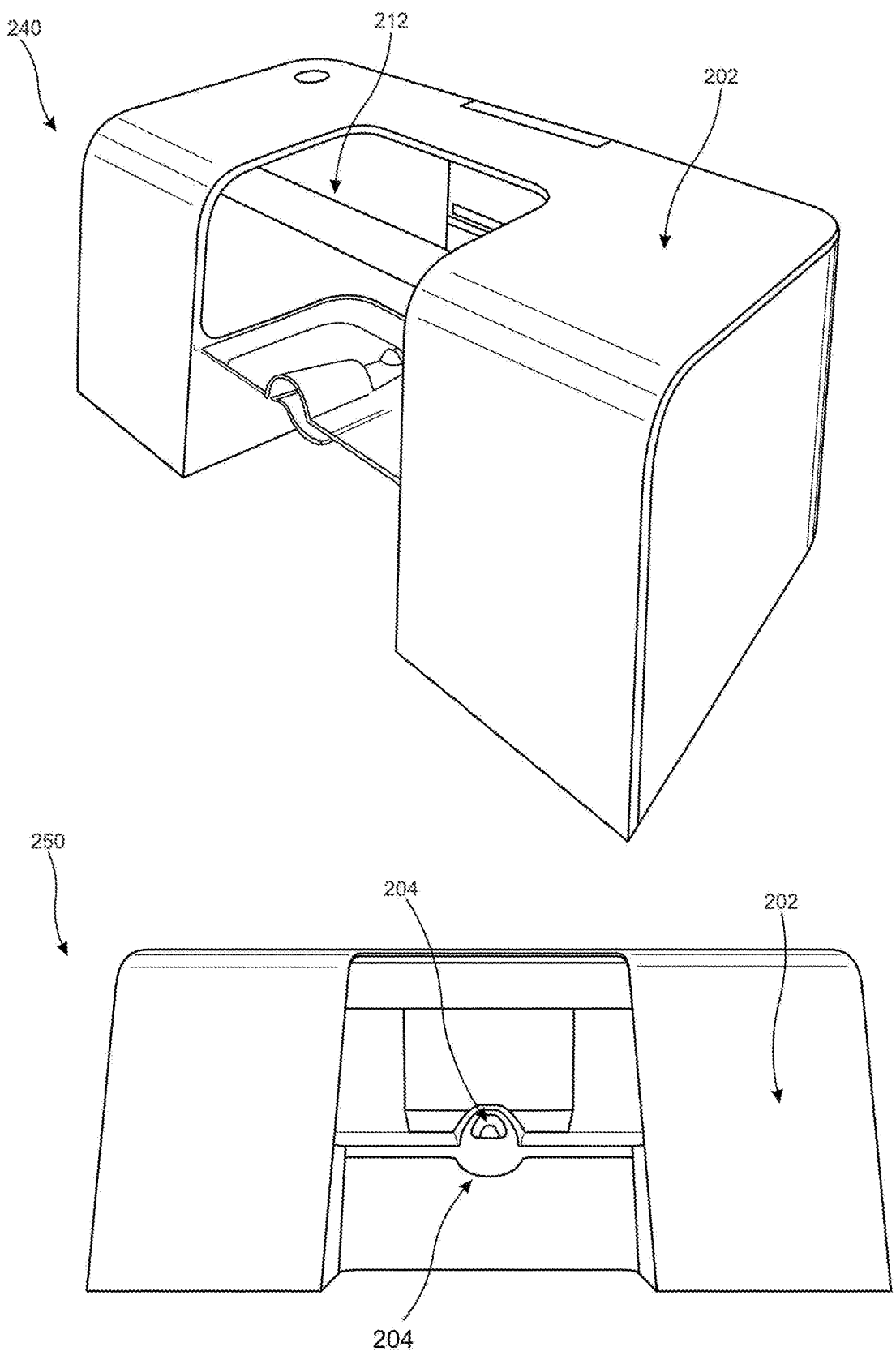

FIG. 2A-2C depict multiple views 210, 220, 230, 240, 250 of an example apparatus or user device 202 to paint or decorate physical targets of varying surface areas or curvature, in accordance with embodiments of the present disclosure.

In one embodiment, the apparatus or user device 202 includes a portable printing device. The portable printing device can also be referred to as a smartphone nail printers, nail robot, a nail decorating apparatus, nail decorating device, etc. The apparatus or user device can include, an external device holder 206 and a finger cradle 204. The external device holder 206 is operable to hold or be coupled to an external device 208 which can be any portable device, a screen, a touch screen, a mobile phone, portable phone, laptop, notebook, tablet, etc. In one embodiment the external device 208 provides the optical or imaging function for the user device 202. For example, a video or image of the painting or decorating process or the physical target to be decorated can be captured via an imaging unit (e.g., a camera, optical device) of the external device. Moreover, note that the external device holder 206 can be retracted as shown in the example view 230 as the user device 202 can be operated without the external device 208. In other embodiments, an imaging unit can be integrated or embedded with the device 202. The user device 202 can also be operated without an imaging unit.

In general, the apparatus 202 can be adapted and configured to operate to make creative expression easier for a consumer. The apparatus 202 can for example be operable to: print or decorate directly onto a fingernail or toenail, print or decorate onto an external material, for example a cloth type consumable, for example, for craft printing, print or decorate external material as a temporary sticker, print or decorate onto a body part as a sticker, tattoo or henna decoration.

In one embodiment, the user device 202 includes a motor (not shown) which controls an applicator to decorate or paint the physical target. During the decorating process with the user device 202 utilizing a motor, a user may keep a finger relatively still inside the opening of the device 202 (e.g., in the finger cradle 204) while the art of design is being printed or decorated on the nail.

The user can control and ascertain where to place the physical target to be painted or decorated (e.g., where a user can place a finger) by viewing the physical target (e.g., finger or nail) through an opening (e.g., opening 212 in example view 240 of FIG. 2C) in the device 202. In one embodiment, the user device 202 can print in "one pass." In general, when the physical target is painted or printed in a single pass, the print size and/or resolution is typically determined by the swath of the paint or color cartridge. If a user wants the image closer to the top of her nail, the user can manually places her nail toward to the front of the finger positioning guide so that the print appears there. The likelihood of a user keeping a finger or any other physical target in the proper position in or on the finger guide (touchscreen, finger cradle, touchpad, etc.) during the selection, decorating and/or printing process is higher and also resulting in higher accuracy.

The disclosed user device 202 is advantageous because it reduces the time (e.g., by minutes or seconds) for art selection or printing experience for example, by removing a step involving the fingernail detection via an optical device and/or smartphone camera.

For example, in some embodiments of user devices for painting or decorating which uses a touchscreen to track a user's finger so that a user can move a target (e.g., finger or nail) at a steady/controlled pace while swiping. In some embodiments of a nail decorating apparatus, it may take many minutes from the process of connecting smartphone, sizing fingernail, scaling art to fit fingernail, downloading art, and processing art to print and then printing that art depending upon resolution settings. For a younger user that has a much smaller fingernail and may be satisfied with a more basic and time constrained experience, it is possible to eliminate detection of the target with an imaging device or camera.

FIG. 3A depicts an example functional block diagram of a host server 300 that facilitates adaptive nail printing and hosts a collaborative beauty platform, in accordance with embodiments of the present disclosure.

The host server 300 includes a network interface 302, a design content manager 310, a simulated view generator 340, a digital asset manager 350, a commerce engine 360, a recommendation engine 370 and/or a recording engine 380.

The host server 300 is also coupled to a user repository 322, a content repository 324 and/or a design content repository 326. Each of the design content manager 310, the simulated view generator 340, the digital asset manager 350, the commerce engine 360, the recommendation engine 370 and/or the recording engine 380 can be coupled to each other.

One embodiment of the design content manager 310 includes, an editing engine 312, a tag manager 314 and/or a tracking engine 318. One embodiment of the digital asset manager 350 includes an editing engine 352, a tag manager 354 and/or a tracking engine 356. One embodiment of the recording engine 380 includes a sharing engine 382 and/or a video/image generator 384.

Additional or less modules can be included without deviating from the techniques discussed in this disclosure. In addition, each module in the example of FIG. 3A can include any number and combination of sub-modules, and systems, implemented with any combination of hardware and/or software modules.

The host server 300, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The network interface 302 can be a networking module that enables the host server 300 to mediate data in a network with an entity that is external to the host server 300, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, 5G, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or have its functionality distributed in part or in full. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, flash, optical storage, to name a few), but may or may not be limited to hardware.

One embodiment of the host server 300 includes the design content 310 having the editing engine 312, the tag manager 314, and/or the tracking engine 318.

The design content manager 310 can be any combination of software agents and/or hardware modules (e.g., including processors and/or memory units) able to manage, facilitate management or collection of, edit, revise, save, tag, track designs, art, patterns, colors, color combinations that can be used to decorate or paint a physical target.

The editing engine 312 can edit, revise or enable editing or revision of art collections. The editing engine 312 can also enable editing, revision of art collections or galleries for example by users, third parties, partners (e.g., promoters, brands businesses), etc. For example, art collections and design collections can be moved, added to, reorganized, recategorized, changed or deleted. Art or design content can have tags identified by or defined via the tag manager 314. Moreover, the tags can be used for grouping of the art or design content and used to track usage, metrics, analytics, and/or ROI (e.g., by the tracking engine 318).

One embodiment of the host server 300 further includes the digital asset manager 350 having the editing engine 352, the tag manager 354, and/or the tracking engine 356.

The digital asset manager 350 can also manage, facilitate management or collection of, tag, track tag statistics, analytics of digital assets including any digital content including user generated content, third party content, sponsored content, ads, hosted content and/or media content or interactive content depicted via the beauty platform or user devices. Similarly digital assets can be changed, revised, edited, saved, organized, categorized via the editing engine 352. The digital assets can also be associated with multiple tags which can be defined, tracked, identified, by the tag manager 354. Metadata or other information such as metrics and other statistics pertaining to the tags can be tracked, stored, and/or reported by the tracking engine 356.

One embodiment of the host server 300 further includes the simulated view generator 340a.

The simulated view generator 340a can be any combination of software agents and/or hardware modules (e.g., including processors and/or memory units) able to render, generate, create or simulate views of how art or design would appear on a physical target (e.g., finger nail, toenail, skin, other targets) when decorated or painted.

The simulated view generator 340a can receive a selection of the art, design or color and generate a simulated view. Any number of views can be generated. The simulated views can be shared with other users via the hosted platform (e.g., the host server 100 of FIG. 1 and/or the host server 300 of FIG. 3A-3B) and/or via a third party platform. Users can also select the art or design which is to be painted or decorated on the physical target.

One embodiment of the host server 300 further includes the commerce engine 360. The commerce engine 360 can be any combination of software agents and/or hardware modules (e.g., including processors and/or memory units) able to facilitate or manage, administer, host, manage a commerce platform or environment for the marketing, sales and/or fulfillment of beauty products relating to cosmetics, consumables for a nail decorating apparatus including nail polish, applicators, stickers, nail polish wipes or removers, or other beauty products. In one embodiment, the commerce engine 360, can provide offerings of products of different tiers to customers based on the user device they are using. For example, higher end products or professional level products can be offered to or recommended at user devices of a higher tier.

One embodiment of the host server 300 further includes the recommendation engine 370. The recording engine 370 can be any combination of software agents and/or hardware modules (e.g., including processors and/or memory units) able to suggest, recommend art, designs to a given user or user device based on a certain context. For example, art or design suggestions can be given based on current ink cartridge levels of various base colors such that the art or design can be reproduced accurately once printed. Certain replenishments or consumables of user devices can also be recommended based on usage level of a given user device so that there is no gap in usage or serviceability of the user device.

One embodiment of the host server 300 further includes the recording engine 380. The recording engine 360 can be any combination of software agents and/or hardware modules (e.g., including processors and/or memory units) able to record, capture, generate, photograph, a decorating or painting session of a physical target (e.g., via the video/image generator 384).

The recorded or capture photograph or video of the decorating of painting session of the physical target (e.g., a finger nail, toenail, skin, tattoo session or henna session) can be shared with other users (e.g., via the hosted platform and/or via a third party platform). Users can engaged with shared media content in a social media context. For example, the content can be further shared, commented on, modified, or further published, etc. The captured video or image can also be modified or enhanced by the video/image generator 384

FIG. 3B depicts an example block diagram illustrating the components of the host server 300 that is able to facilitate adaptive nail printing and host a collaborative beauty platform, in accordance with embodiments of the present disclosure.

In one embodiment, host server 300 includes a network interface 302, a processing unit 334, a memory unit 336, a storage unit 338, a location sensor 340, and/or a timing module 342. Additional or less units or modules may be included. The host server 300 can be any combination of hardware components and/or software agents to deploy and administer virtual objects for various disclosed applications. The network interface 302 has been described in the example of FIG. 3A.

One embodiment of the host server 300 includes a processing unit 334. The data received from the network interface 302, location sensor 340, and/or the timing module 342 can be input to a processing unit 334. The location sensor 340 can include GPS receivers, RF transceiver, an optical rangefinder, etc. The timing module 342 can include an internal clock, a connection to a time server (via NTP), an atomic clock, a GPS master clock, etc.

The processing unit 334 can include one or more processors, CPUs, microcontrollers, FPGAs, ASICs, DSPs, or any combination of the above. Data that is input to the host server 300 can be processed by the processing unit 334 and output to a display and/or output via a wired or wireless connection to an external device, such as a mobile phone, a portable device, a host or server computer by way of a communications component.

One embodiment of the host server 300 includes a memory unit 336 and a storage unit 338. The memory unit 335 and a storage unit 338 are, in some embodiments, coupled to the processing unit 334. The memory unit can include volatile and/or non-volatile memory. In adaptive nail printing and/or hosting of a collaborative beauty platform, the processing unit 334 may perform one or more processes related to sizing of art or designs for decorating physical targets. The processing unit 334 can also perform one or more processes related to managing art or design content to be selected for decorating or printing on physical targets.

In some embodiments, any portion of or all of the functions described of the various example modules in the host server 300 of the example of FIG. 3A can be performed by the processing unit 334.

Figure 4A:
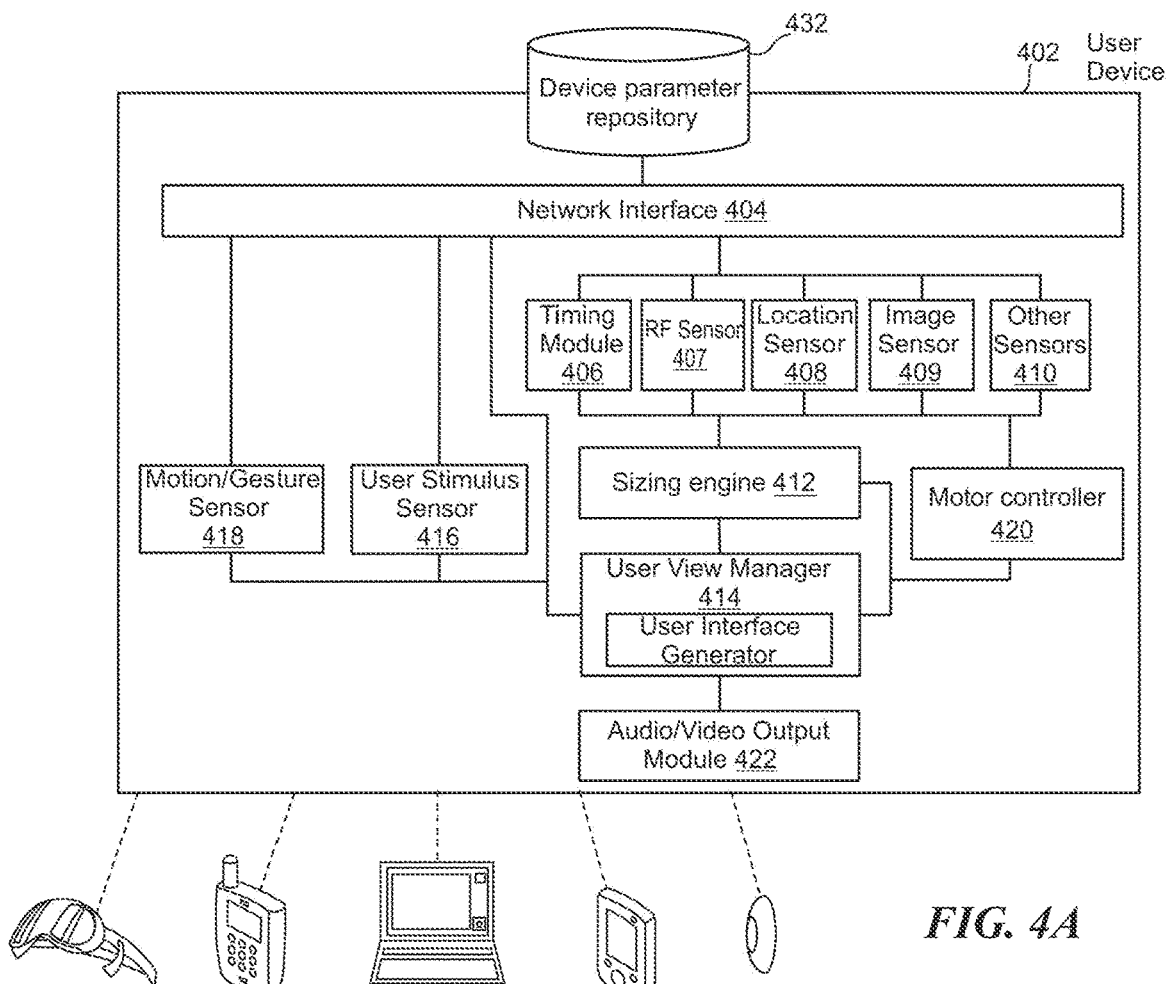
FIG. 4A depicts an example functional block diagram of a client device able to decorate physical targets and to provide access to a collaborative beauty platform, in accordance with embodiments of the present disclosure

FIG. 4A depicts an example functional block diagram of a client/user device 402 able to decorate physical targets and to provide access to a collaborative beauty platform, in accordance with embodiments of the present disclosure.

The client device 402 can include a network interface 404, a timing module 406, an RF sensor 407, a location sensor 408, an image sensor 409, a sizing engine 412, a user view manager 414, a user stimulus sensor 416, a motion/gesture sensor 418, a motor controller 420, an audio/video output module 422, and/or other sensors 410. The user device 402 may be any electronic device such as the devices described in conjunction with the user devices 102A-N in the example of FIG. 1 including but not limited to a nail decorating apparatus, portable devices, a computer, a server, location-aware devices, mobile phones, PDAs, laptops, palmtops, iPhones, cover headsets, heads-up displays, helmet mounted display, head-mounted display, scanned-beam display, smart lens, monocles, smart glasses/goggles, wearable computer such as mobile enabled watches or eyewear, and/or any other mobile interfaces and viewing devices, etc.

In one embodiment, the user device 402 is coupled to a device parameter repository 432. The device parameter repository 432 may be internal to or coupled to the user device 402 but the contents stored therein can be further described with reference to the example of the device parameter repository 132 described in the example of FIG. 1.

Additional or less modules can be included without deviating from the novel art of this disclosure. In addition, each module in the example of FIG. 4A can include any number and combination of sub-modules, and systems, implemented with any combination of hardware and/or software modules.

The client device 402, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 4A, the network interface 404 can be a networking device that enables the user device 402 to mediate data in a network with an entity that is external to the host server, through any known and/or convenient communications protocol supported by the host and the external entity. The network interface 404 can include one or more of a network adapter card, a wireless network interface card, a router, an access point, a wireless router, a switch, a multi-layer switch, a protocol converter, a gateway, a bridge, bridge router, a hub, a digital media receiver, and/or a repeater.

According to the embodiments disclosed herein, the user device 402 can enable or perform adaptive printing of physical targets such as finger nails, toenails, other body parts or other printable physical objects. The sizing engine 412 can determine an approximate size, area or volume of the physical target to be printed and resize the art or design accordingly. The sizing can for example, be performed automatically based on predetermined user categories. The motor controller 420 is operable to control or move an applicator which applies the colors to print a design or art on a physical target. For instance, the physical target can rest in a cradle (e.g, a finger cradle for a nail printing device) and the motor controller 420 can operate a motor to move a cartridge to paint or decorate the physical target. The physical target can be painted or decorated in a single pass of the motor or in multiple passes.

Some embodiments of the user device 402 include an image sensor 409 which can be used to determine printing area of the physical target. The image sensor 409 can also capture simulated views of the physical target depicting what it would look like given the printing of selected art or design. The image sensor 409 can also capture photos or videos of a decorating or painting process and/or of the fully decorated physical target. Depictions of the simulated views and/or controls of the nail printing process can be generated and depicted by the user view manager 414.

The user device 402 can provide functionalities described herein via a consumer client application (app) (e.g., consumer app, client app. Etc.). The consumer application includes a user interface that generates views (e.g., via the user interface generator of the user view manager 414) of an environment for use in selecting art, downloading art, trying on art or generating simulated views of art on a physical target to be printed.

Figure 4B:
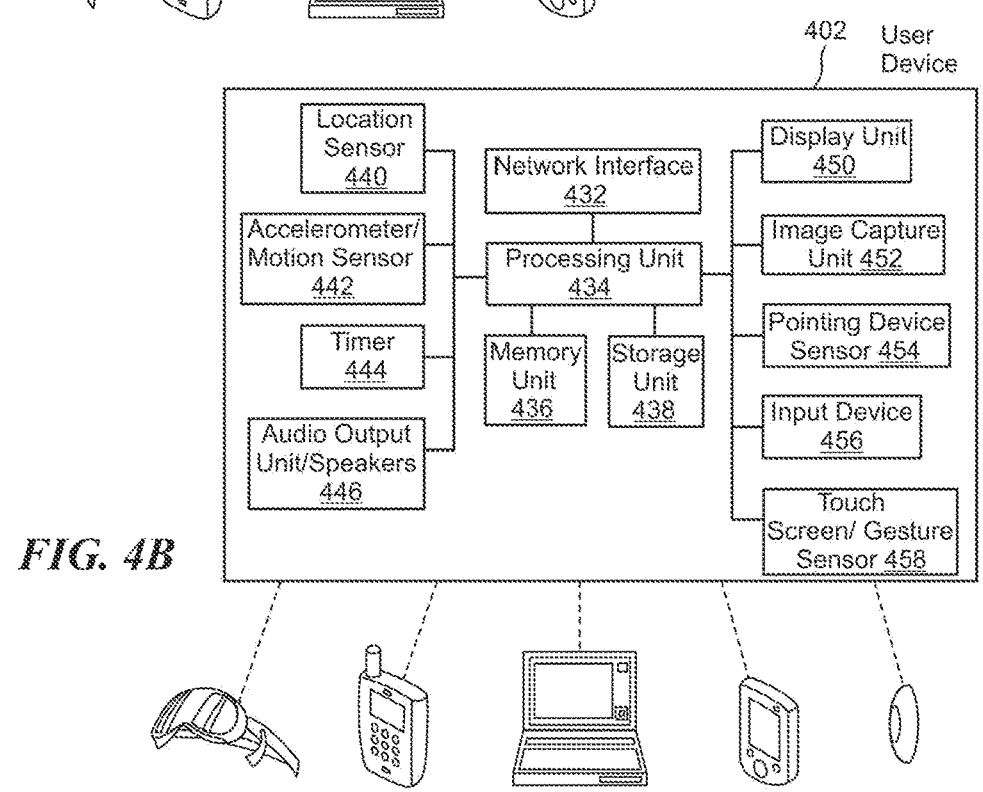
FIG. 4B depicts an example block diagram of the client device able to decorate physical targets and to provide access to a collaborative beauty platform, in accordance with embodiments of the present disclosure.

FIG. 4B depicts an example block diagram of the user device 402 able to decorate physical targets and to provide access to a collaborative beauty platform, in accordance with embodiments of the present disclosure.

In one embodiment, user device 402 (e.g., a user device) includes a network interface 432, a processing unit 434, a memory unit 436, a storage unit 438, a location sensor 440, an accelerometer/motion sensor 442, an audio output unit/speakers 446, a display unit 450, an image capture unit 452, a pointing device/sensor 454, an input device 456, and/or a touch screen sensor 458. Additional or less units or modules may be included. The user device 402 can be any combination of hardware components and/or software agents that generates controls for art selection for decoration of a physical target in accordance with various disclosed applications, and enables art or design or print manipulation (e.g., The network interface 432 has been described in the example of FIG. 4A.

One embodiment of the client device 402 further includes a processing unit 434. The location sensor 440, accelerometer/motion sensor 442, and timer 444 have been described with reference to the example of FIG. 4A. The processing unit 434 can include one or more processors, CPUs, microcontrollers, FPGAs, ASICs, DSPs, or any combination of the above. Data that is input to the client device 402 for example, via the image capture unit 452, pointing device/sensor 554, input device 456 (e.g., keyboard), and/or the touch screen sensor 458 can be processed by the processing unit 434 and output to the display unit 450, audio output unit/speakers 446 and/or output via a wired or wireless connection to an external device, such as a host or server computer that provides or managers a collaborative beauty platform by way of a communications component.

One embodiment of the client device 402 further includes a memory unit 436 and a storage unit 438. The memory unit 436 and a storage unit 438 are, in some embodiments, coupled to the processing unit 434. The memory unit can include volatile and/or non-volatile memory. In nail or target printing/decorating, the processing unit 434 can perform one or more processes related to adaptively sizing the physical target and/or controlling a motor to decorate the target based on the size setting or determined size.

In some embodiments, any portion of or all of the functions described of the various example modules in the client device 402 of the example of FIG. 4A can be performed by the processing unit 434. In particular, with reference to the user device illustrated in FIG. 4A, various sensors and/or modules can be performed via any of the combinations of modules in the control subsystem that are not illustrated, including, but not limited to, the processing unit 434 and/or the memory unit 436.

Figure 5:
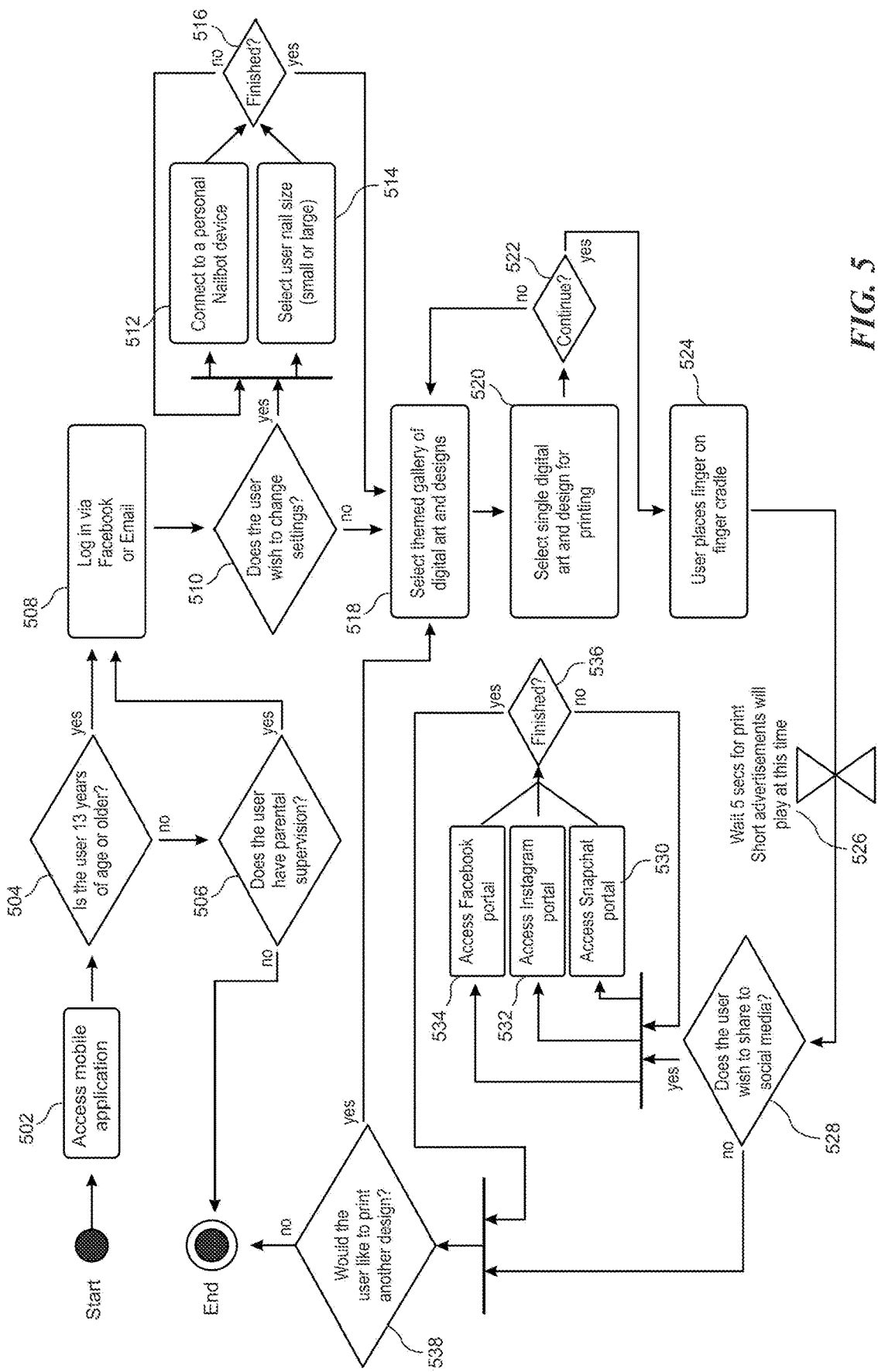
FIG. 5 depicts a diagrammatic examples showing user experience flows in nail printing and engaging with a collaborative beauty platform, in accordance with embodiments of the present disclosure.

FIG. 5 depicts a diagrammatic example showing user experience flows in nail printing and engaging with a collaborative beauty platform, in accordance with embodiments of the present disclosure.

In process 502, a user can access a mobile application to initiate nail printing or to access the collaborative beauty platform. The system (e.g., a nail decorating apparatus such as the device or apparatus 202 as shown in the examples of FIG. 2A-FIG. 2C, the host server 100 of FIG. 1 and/or the host server 300 of FIG. 3A-3B) can determine whether the user is of a predetermined age (e.g., at least 13 years of age 504). If so, the user is prompted to log in, as in process 508. If not, the system prompts for or determines if the user has adult or parental supervision as in process 506 and the process can terminate absent such approval. The operation can continue to process 508 given a determination of the proper adult or parent consent or supervision.

In process 510, the system determines whether the user wishes to change any settings. If so, the connection to a user device (e.g., a nail decorating apparatus such as the device or apparatus 202 as shown in the examples of FIG. 2A-FIG. 2C) is initiated in process 512 and a user nail size can be selected (e.g., small, medium, large, or others) as in process 514. If the user does not wish to change the settings or after completion of changes to settings as in process 516, the user is prompted to select from digital art and designs (e.g., from a themed gallery), in process 518.

In process 520, the user can select art of design to be printed. The user can be prompted as to whether to continue with the printing in process 522. If so, in process 524, the user can place a finger or other physical target on a cradle (e.g a finger cradle) of the user device. While printing, media or other content (e.g., advertisement) can be played back as in process 526. In process 528, the printing consummates and the user is prompted to share the result of the printing (e.g., as captured in an image or video) via social media. The user can share the image or video or other content via, for example, Facebook (in process 534), via Instagram (in process 532), via Snapchat (in process 530), or a hosted platform (e.g., hosted by the host server 100 of FIG. 1 and/or the host server 300 of FIG. 3A-3B), or any other platforms. The operation can then complete in process 536.

Figure 6:
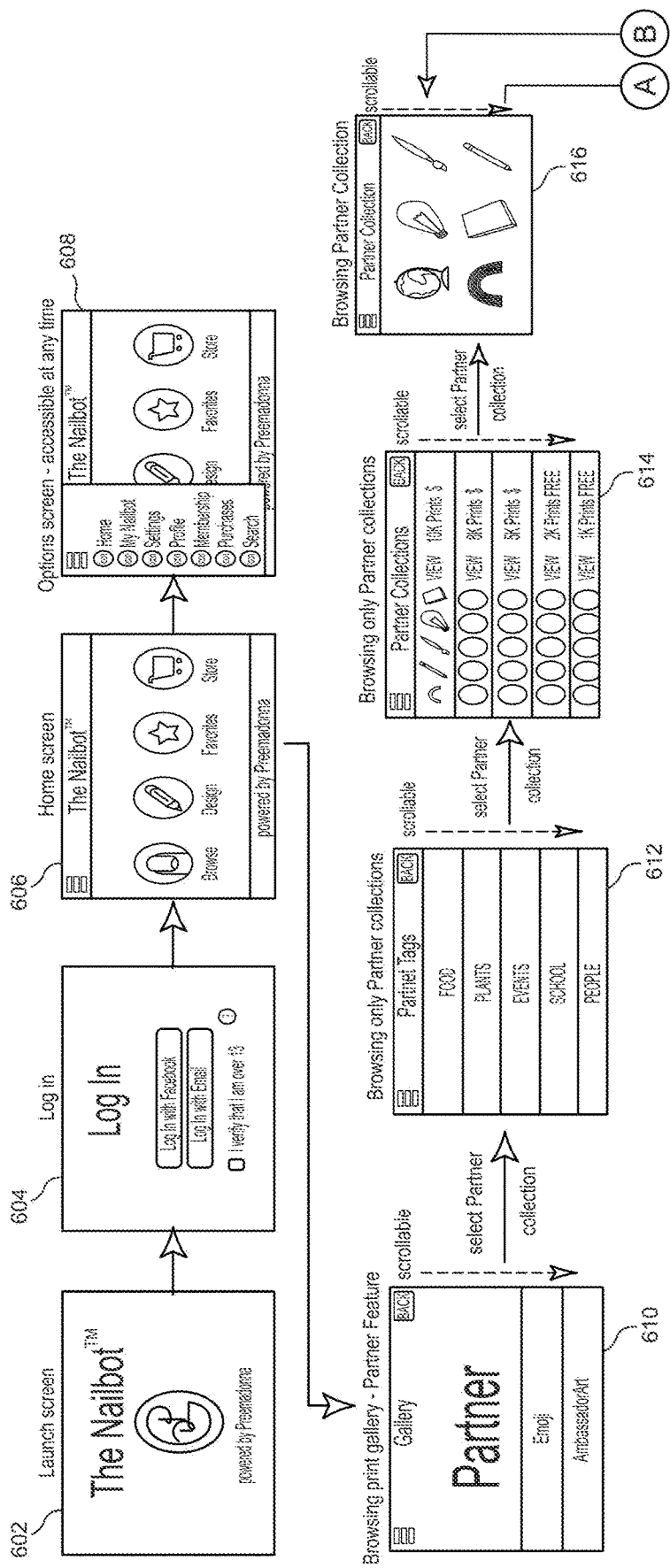
FIG. 6-7 graphically depict example user interfaces for discovering, browsing or designing design content for decorating a physical target, and further accessing a collaborative beauty platform, in accordance with embodiments of the present disclosure.
Figure 7:
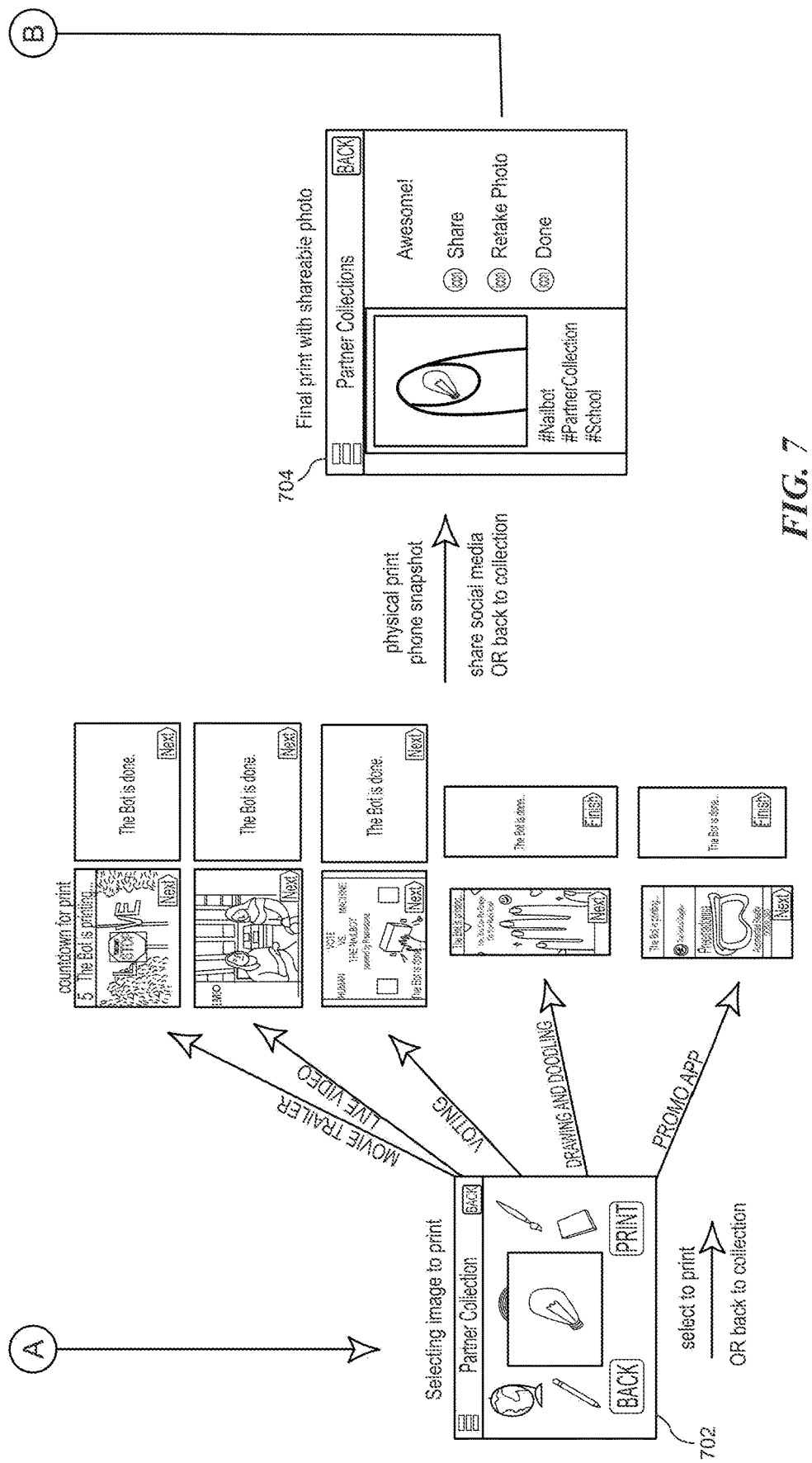

FIG. 6-7 graphically depict example user interfaces for discovering, browsing or designing design content for decorating a physical target, and further accessing a collaborative beauty platform, in accordance with embodiments of the present disclosure.

The device launches in 602 and the user is allowed to login in 604. The home screen example of 606 allows the user to browse art selection, to design art, to access favorites and/or to access/browse an ecommerce store. An options screen 608 can also be launched from the home screen 606.

On selection of browse from home screen 606, the print gallery 610 is depicted showing partner collection, emojis, or other art. On selection of partner collection, the various partner tags and collections are shown in 612, 614 and 616.

The flow continues at A in FIG. 7. In 702 the user can select an image from the depicted selection to print a physical target or back to access any other collection. While printing, the user can be prompted to view a trailer, a live video, to vote, to draw/doodle, to view a promo app, or to engage in any other activity. The printing completes in 704 and the user can share a photo or video of the completed product. On completion the process can continue back to B of FIG. 6.

Figure 8A:
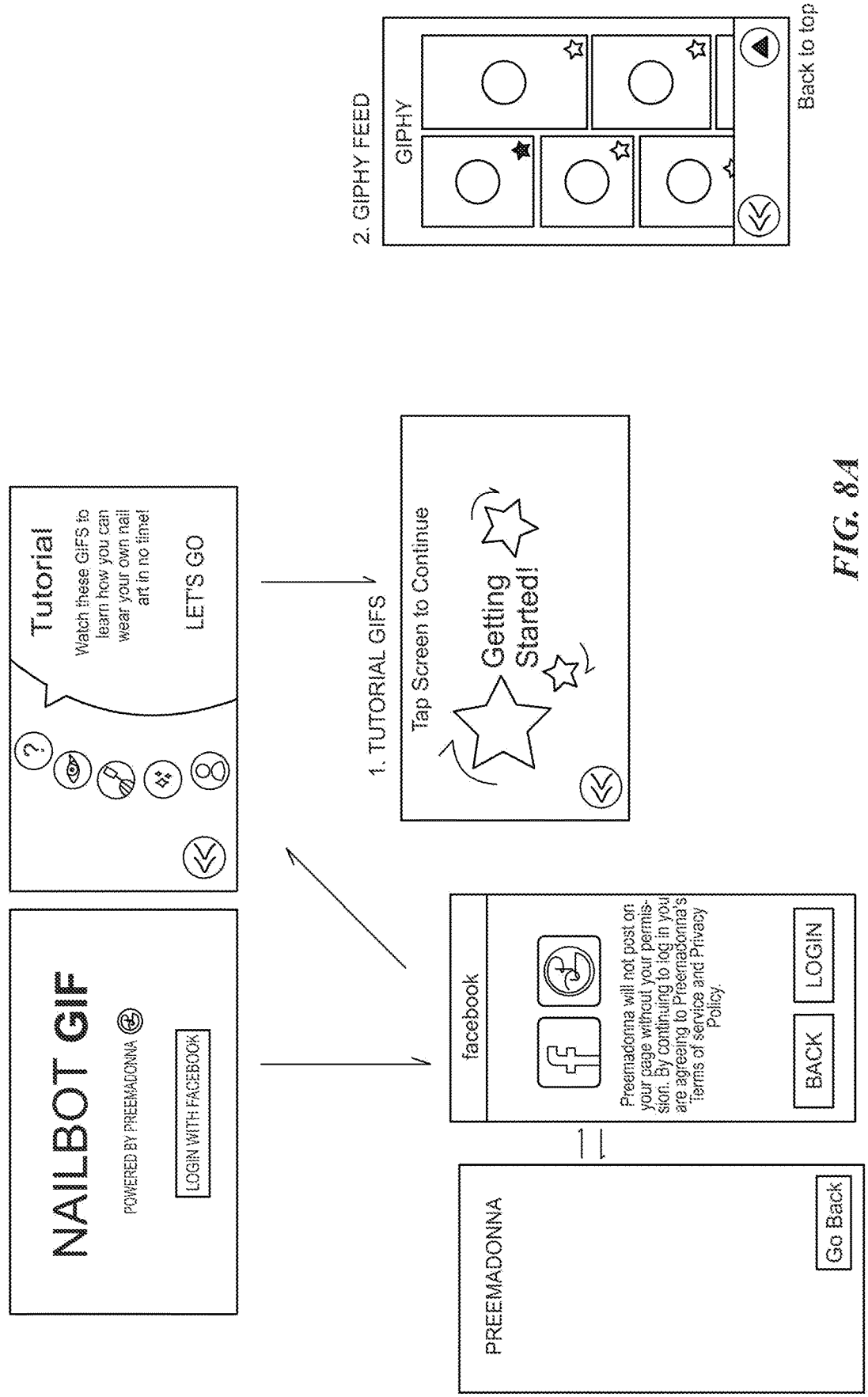
FIG. 8A-8B graphically depict example user interfaces for generating simulated views of a physical target decorated using various designs provided via a beauty platform, in accordance with embodiments of the present disclosure.
Figure 8B:
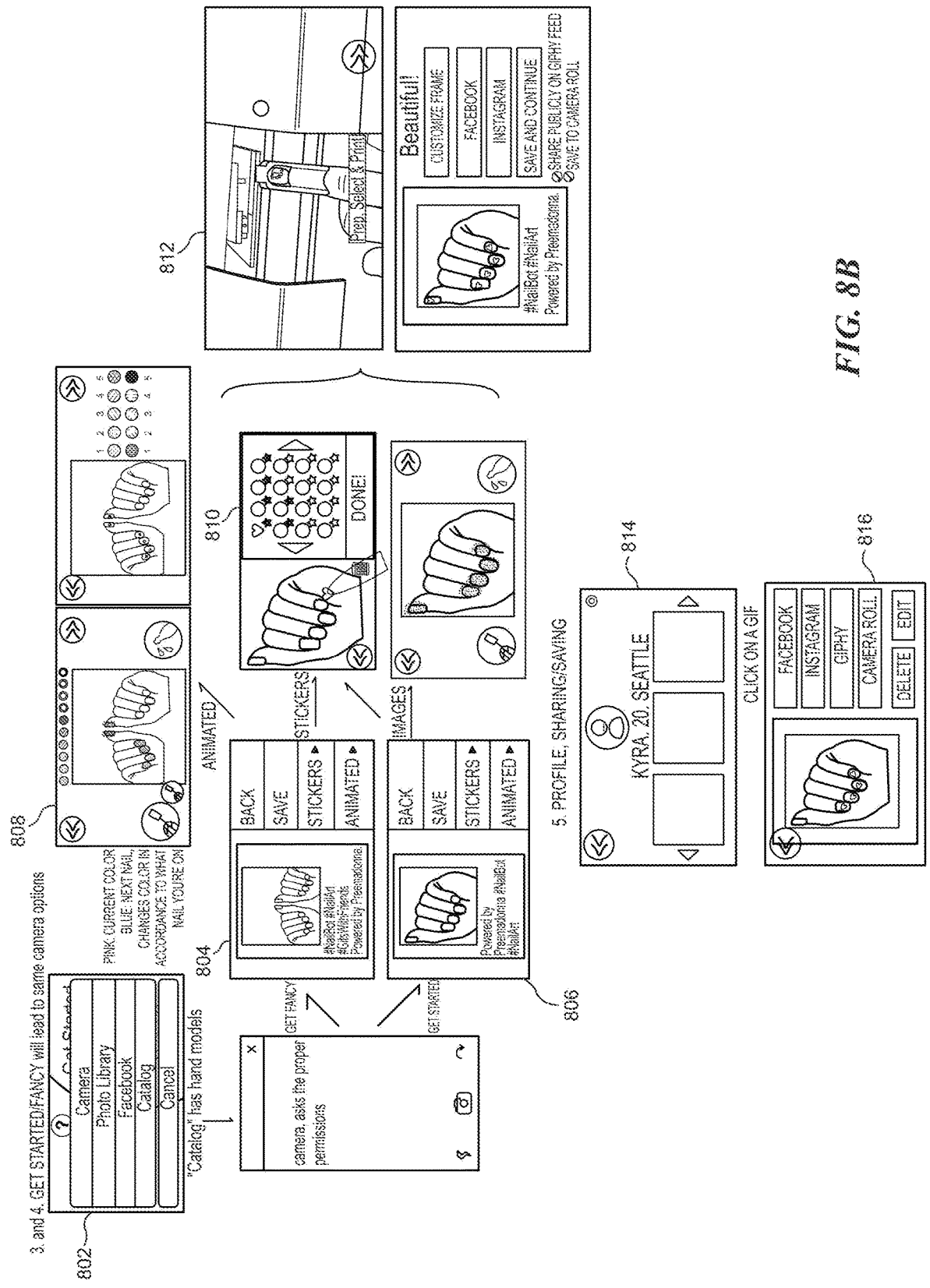

FIG. 8A-8B graphically depict example user interfaces for generating simulated views of a physical target decorated using various designs provided via a beauty platform, in accordance with embodiments of the present disclosure.

To generate a simulated view prior to printing, the user can select camera in 802. In 804 and 806, the user can select the art they would like to try on and the system generates the simulated views in 808 and 810. After generating the simulated view, the user can print the physical target with the selected art in 812 and posted it to their profiled 814 and/or share it, save it, delete or edit it in 816.

Figure 9A:
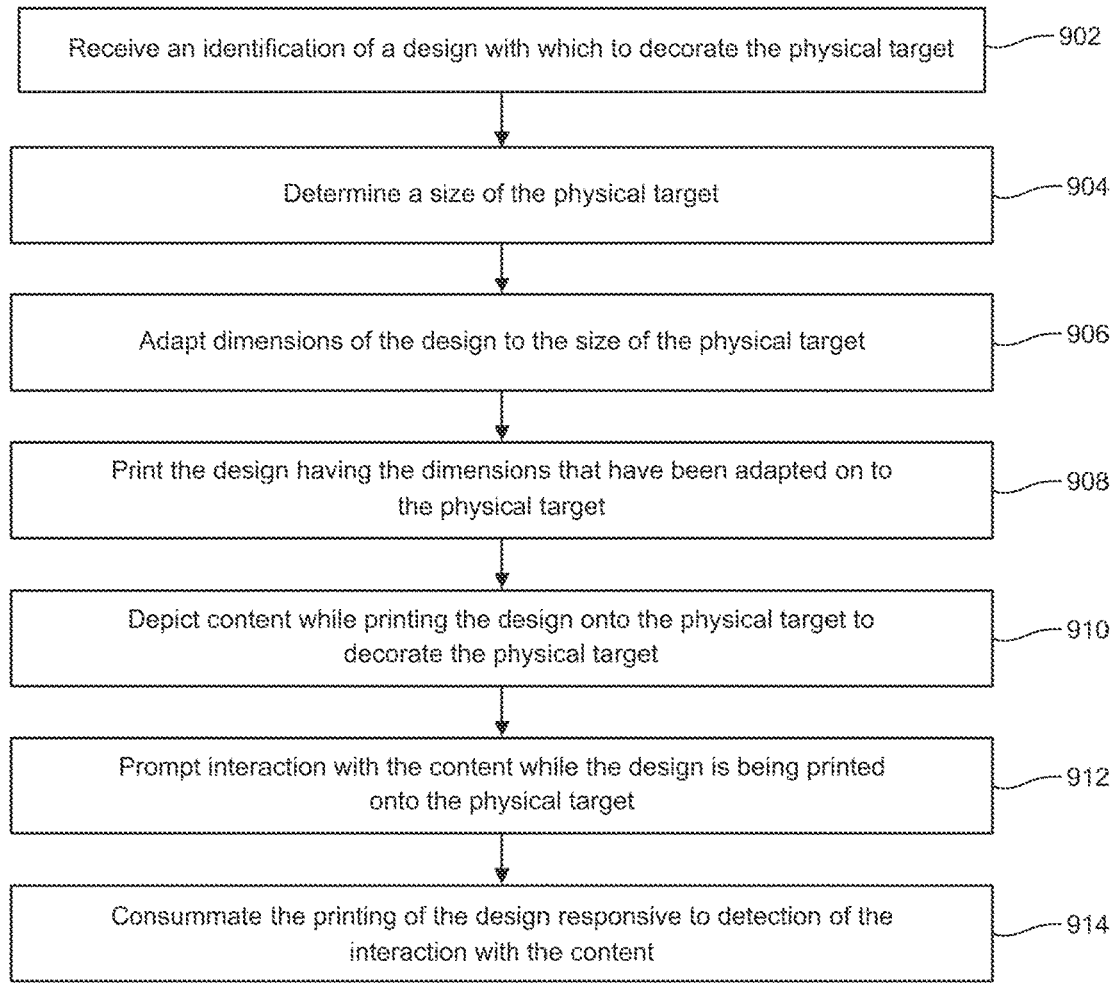
FIG. 9A depicts a flow chart illustrating an example process to decorate a physical target, in accordance with embodiments of the present disclosure.

FIG. 9A depicts a flow chart illustrating an example process to decorate a physical target, in accordance with embodiments of the present disclosure.

An identification of a design with which to decorate the physical target is received, in process 902. For example, a design can include one or more of, a color, multiple colors, color patterns, a GIF, an emoji, or any other digital art selections. Note that the physical target can include a body part such as a finger nail or a toe nail, skin, hair etc. The physical target can also include printable material such as cloth, clothing, artwork, sculpture etc. Note that the design can also include a tattoo design and/or a henna design printable on human skin or other body parts.

The design can be provided by the host (e.g., the host server 100 of FIG. 1 and/or the host server 300 of FIG. 3A-3B), a third party or designed by a user (e.g., user 116A-N shown in the example of FIG. 1) or their friends and connections. For example, the design can be created on demand by the user and/or friends or connections. The design can be selected by the user from the library. In general, the design can be identified from multiple designs (e.g., as illustrated with reference to the example of FIG. 6). Some of the designs can include sponsored content.

The design can be printed onto a physical target by a first device (e.g., a device 202 as shown in the examples of FIG. 2A-FIG. 2C). The device (e.g, user device) can include a printing apparatus (e.g., nail decorating device or nail decorating apparatus) which can include, one or more of, an applicator and a finger guide. The applicator can apply the coating for painting, decorating or coloring the physical target. The finger guide can include a finger cradle. In a further embodiment, the finger guide includes a touch screen which can be integrated with the device or be a part of an external device or external touch screen coupled to the device, In printing the design, a size of the physical target is determined in process 904. For instance, the surface area and/or curvature (e.g., 2D and/or 3D shape and/or form) can be determined (e.g., via computer vision.). The size can also be determined from a set of predetermined size ranges for the physical target. The dimensions of the design are adapted to the size of the physical target in process 906. In a further example, pre-sized images can be used, for example, in either a small format, medium format, or large format, depending on the user's nail bed size, surface area, shape, curvature, form and/or design preferences. A user can also resize the image by scaling, cropping and/or enhancing to a size based on her estimate, measurement or an intelligent recommendation of how a fingernail may be.

The design having the dimensions that have been adapted, are printed on to the physical target in process 908. The design can be printed, painted or decorated by the applicator of the device onto the physical target (e.g., nail or other body part or other printable targets).

Content is depicted while printing the design onto the physical target to decorate the physical target, in process 910.

In one embodiment, the content is depicted via a second device coupled to the first device. For example, the content can be depicted via a second device (e.g., a touch screen, a mobile device, a portable device, a mobile phone etc.) operably coupled to the first device (user device). The second device can also include an optical scanner, imaging device, optical device or any camera view, image, record a decoration session. In addition the second device can render or depict content (e.g., audio content, video content and/or any other interactive content) during the printing or decorating process.

The content depicted or rendered can include third party sponsored content including promotions or advertisements. In addition, the first device (e.g., a nail decorating apparatus such as the device or apparatus 202 as shown in the examples of FIG. 2A-FIG. 2C) can depict or display a countdown of the printing process in full view or partial view of a screen (e.g., a screen integrated with the first device or a screen of an external device) during a segment of media rendering (e.g., interactive entertainment) or video advertising.

In addition to finger touch engagement for either art searching or selection, printing, and/or accessing interactive entertainment, a user can activate their voice for the interactive content and finish or continue button. Voice activation can be configured directly within the first device and/or via a third party system device system (e.g., Alexa) configured with the first device used with the apparatus. The apparatus can include a device configured for use with a third party device system. In one embodiment, the third party device system includes a smart device hub that controls various applications including lighting, internet searches on a portable electronic device, calling contacts, etc. with voice activation.

Interaction with the content is prompted while the design is being printed onto the physical target, in process 912. The user can view live stream of the nail being printed (e.g., via an integrated/embedded imaging unit or an external device camera of the nail decorating apparatus). Forms of interactive content that the user may engage in during the printing mobile app screen can include by way of example, activities for polling, doodling, scribbling, coloring or drawing, voting, live video from users or from third party social networks including Facebook or Instagram, movie or sitcom trailers, or advertisements on third party networks or provided by third party content providers, third party application publishers or developers.

For example, while the nail design and art image is being processed to print and/or actual printing is taking place, the user may view an interactive screen on the mobile device connected (wirelessly and/or physically) to the nail decorating apparatus. It can also give the user a countdown on print timing and asks the use to keep the fingernail steady.

Consummate the printing of the design responsive consummates to detection of the interaction with the content, in process 914. For example, a user can be requested or required to select objects or interactive content to move onto to "Finish print" screen in engaging with interactive content (Video/poll/questionnaire/doodle). The interaction can also be triggered with voice activation instead of or in addition to screen activation (e.g., manually touching the screen with a finger or stylus instrument).

A further embodiment includes creating a video of the design being printed onto the physical target and/or capturing an image of the design printed onto the physical target. The video and/or image can be captured using an integrated imaging unit (e.g., camera or any optical device) with the first device (e.g., a nail decorating apparatus such as the device or apparatus 202 as shown in the examples of FIG. 2A-FIG. 2C). The video/image can also be captured via an imaging unit coupled to the first device (e.g., a nail decorating apparatus such as the device or apparatus 202 as shown in the examples of FIG. 2A-FIG. 2C). Moreover the video and/or the image can be shared with others via a platform (e.g., the host server 100 of FIG. 1 and/or the host server 300 of FIGS. 3A-3B and/or via a third party platform).

For example, the first device and/or an external device coupled to the first device can record the printing process and export the media (e.g., as a social media content) to any third party platform. The system can generate social media and social share feature. The system can also recommend internal network circle or external sharing platform based on content management tagging. An example process flow for implementation and performing the above described steps is further illustrated in the example of FIG. 5.

Figure 9B:
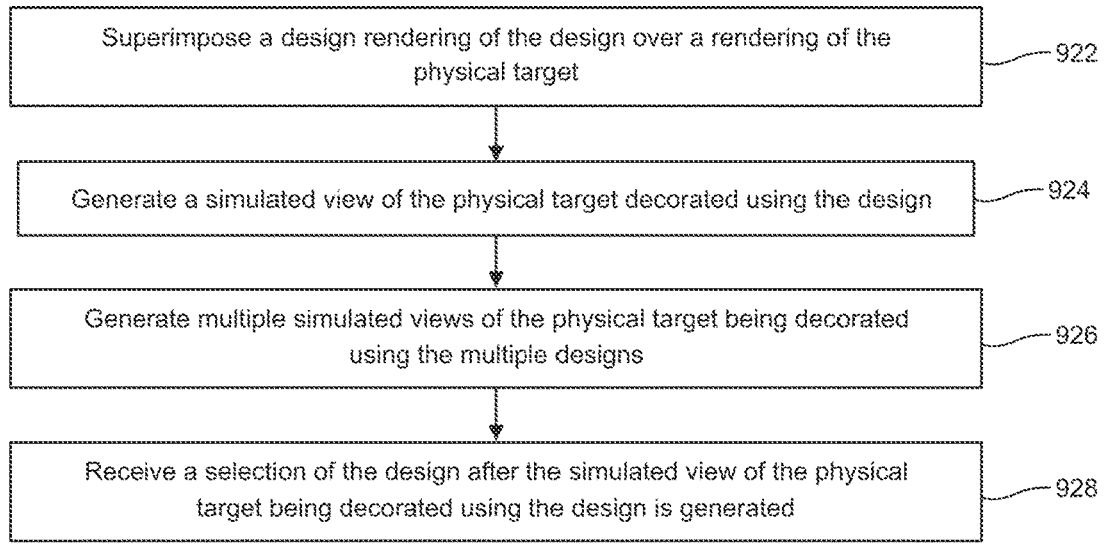
FIG. 9B depicts a flow chart illustrating an example process to generate a simulated view of a physical target to be decorated, in accordance with embodiments of the present disclosure.

FIG. 9B depicts a flow chart illustrating an example process to generate a simulated view of a physical target to be decorated, in accordance with embodiments of the present disclosure.

The disclosed embodiment enables users to 'try on' nail art of decoration before actual printing or coloring of the physical target occurs. The trying on of art can include, for example, telling story on nails with traveling stickers, gifs, emoji. For example, a user can select a color, design, or other art and view what the selected art/design would look like decorated on a physical target (e.g., nails, body parts or other items). The user can select to view many designs/arts and what they may look like if they were painted on the physical target before selecting a design to actually be printed or decorated on the physical target. The user can also select to share simulated views of a design painted on a given target with other users, via a hosted platform or a third party platform.

Different designs or colors can also be selected to be painted on or used to decorate different parts of components of the physical target. For example, a user can select to view how different colors or designs look on different nails. When the simulated views are generated, they can be saved on a local device, to the user profile and/or shared with other users via a hosted platform or a third party platform.

Example user interfaces illustrating the process to try on art before printing are illustrated in the FIG. 8A-FIG. 8B.

To preview what a design or art would look like if it were painted or used to decorate a physical target, a design rendering of the design is superimposed over a rendering of the physical target, in process 922. A simulated view of the physical target is decorated using the design is generated, in process 924.

Note that the simulated view of the physical target decorated using the design is shareable via a third party platform (e.g., by a third party application publisher or developer, content provider, etc.) or a hosted platform (e.g., the host server 100 of FIG. 1 and/or the host server 300 of FIG. 3A-3B).

Multiple simulated views of the physical target being decorated are generated using the multiple designs, in process 926. A selection of the design is received after the simulated view of the physical target being decorated using the design is generated, in process 928.

Figure 10A:
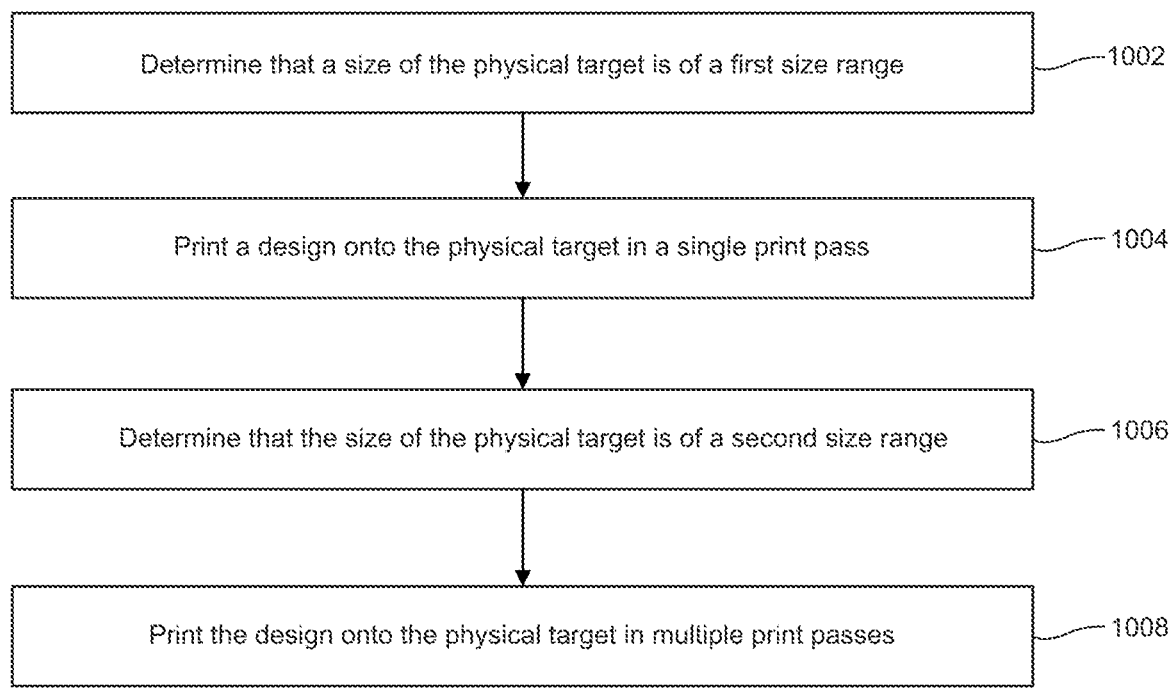
FIG. 10A-10B depict flow charts illustrating example processes of adaptive nail printing and dynamic recommendations, in accordance with embodiments of the present disclosure.
Figure 10B:
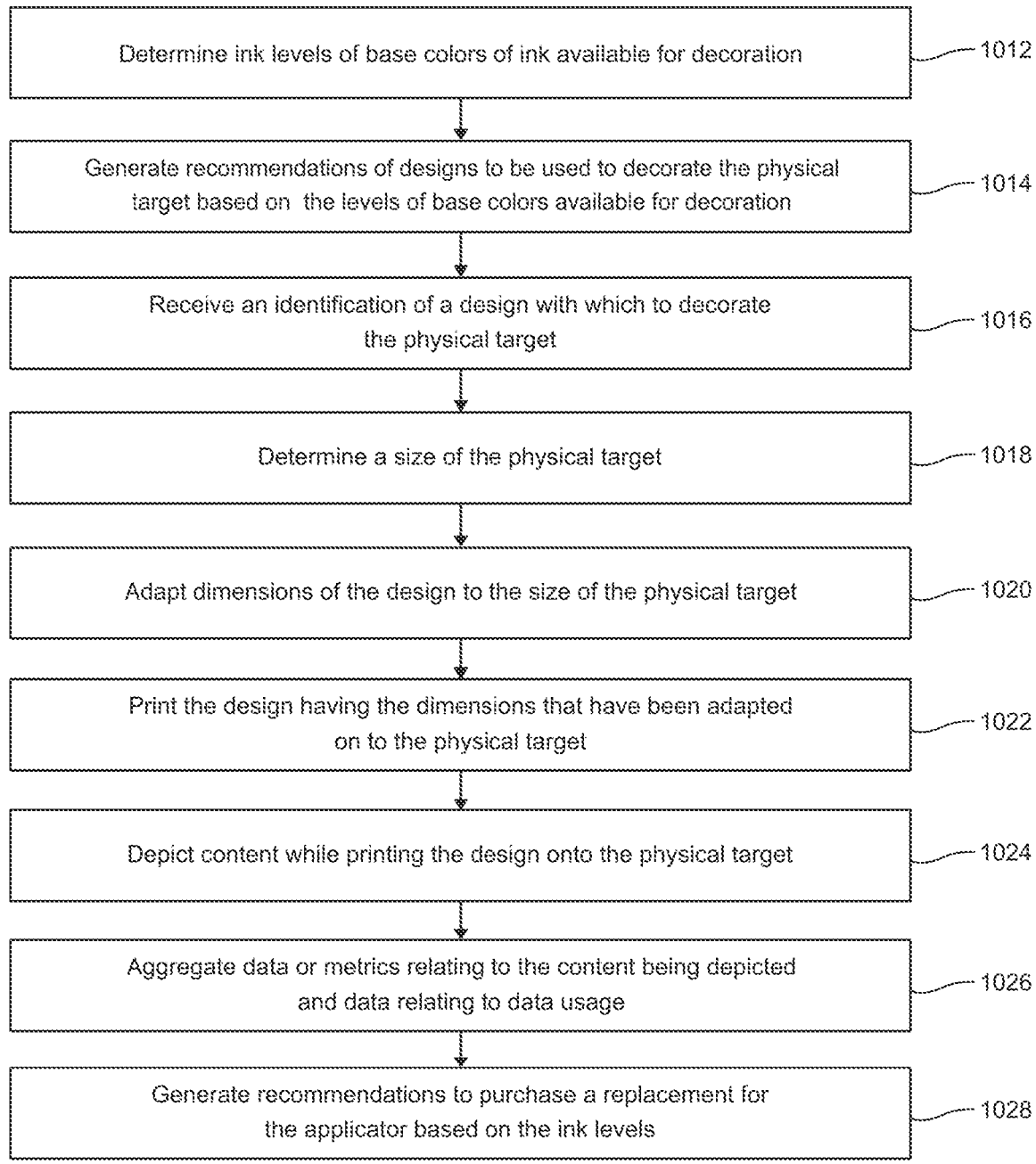

FIG. 10A-10B depict flow charts illustrating example processes of adaptive nail printing and dynamic recommendations, in accordance with embodiments of the present disclosure.

It is determined that a size of the physical target is of a first size range (e.g., one of pre-sized small, medium and large), in process 1002. A design is printed onto the physical target in a single print pass, in process 1004. It is determined that the size of the physical target is of a second size range, in process 1006. One embodiment includes, adapting dimensions of the design to the first size range or to the second size range of the physical target.

The design is printed onto the physical target in multiple print passes, in process 1008. the multiple print passes can, for example, be printed in the first direction and a second direction, the second direction being substantially perpendicular to the first direction.

The design is printed onto the physical target in a single print pass in a first direction and of a first resolution. Note that the design printed onto the physical target in the multiple print passes can be of a second resolution where the second resolution is higher than the first resolution. For instance, the first resolution is between 100-600 dpi; the second resolution is between 600-3000 dpi.

In one embodiment, the physical target includes a nail and the size of the physical target can be determined based on an age of a user to whom the nail belongs. For example, to enhance the user experience through reducing experience time—especially for a younger user—pre-sized small, medium and large images can be used. In addition, a user can resize the image to a size based on an estimate, measurement or an intelligent recommendation of how large their finger nail may be.

Embodiments of the present disclosure further enable generation or computation of parameters and determination of configuration/settings for a broad array of users across geographies, age ranges, genders, and professional segments. Parameters and settings of the device and system can be different and adapted or configured depending upon the type of user. For example, younger consumers (e.g., children or young girls) can be satisfied with a lower resolution (pixels or dots per inch) of a print. The ideal area or size of the physical nail print performed by the apparatus for a user with a smaller fingernail (e.g., child or younger girl) may be smaller. For adults, premium users, premium memberships, or professional salons, the print area can be adapted to cover a larger area for an adult human nail and/or with a higher resolution quality for example, with the resolution reaching 600 to 3000 dots per inch, or more.

The advantages of this configurability includes using the same or similar hardware architecture including the same carriage, motor(s), service stations, ink jet cartridge, modular finger cradles for different nail sizes, apparatus housing and mobile phone stands across variations of the disclosed system. This allows the manufacturer or seller of the device (e.g., a nail decorating apparatus such as the device or apparatus 202 as shown in the examples of FIG. 2A-FIG. 2C) to utilize the same supply chain to drive the manufacturing costs of the apparatus down and relay those savings on to the user. The settings and print applications of various embodiments of the device (e.g., a nail decorating apparatus such as the device or apparatus 202 as shown in the examples of FIG. 2A-FIG. 2C) can be configured through registration of the nail decorating apparatus.

Configuration of print resolution (e.g., pixels, dots per inch, color ray, number of print passes over the nail) can be determined upon registration of the system or apparatus with software agent or module that works with the system. For example, registration of the apparatus (e.g., via a unique electronic or physical identifier) occurs when the apparatus paired with the agent or module. This pairing can occur via wireless communication (e.g., Wi-Fi, Bluetooth, BLE, etc.) or having the user enter in codes, passwords or scanning an electronic key. Once identified, the agent or module paired with the apparatus may display a set of parameters specific to the type of nail decorating apparatus identified.

For example, a user that purchased a toy version (e.g., a junior version) of the device (e.g., a nail decorating apparatus such as the device or apparatus 202 as shown in the examples of FIG. 2A-FIG. 2C) can see a mobile application launch or home screen that displays settings for the toy version (e.g., Nailbot for Preemadonna Girl). The print resolution can for example, be 150 to 600 dots per inch, and by default by one print pass of the cartridge. In certain instances, an optical system for fingernail or finger detection by not be used even if the apparatus includes an external (embedded) camera(s) or a smartphone paired with the device. In some instances, the nail decorating apparatus may be the same but the user is of a lower membership tier and thus offered a limited set of features.

In a further example, the device (e.g., a nail decorating apparatus such as the device or apparatus 202 as shown in the examples of FIG. 2A-FIG. 2C) can be configured for or adapted for adult use or professional salon. In this example, print resolution can reach 600 to 3000 dots per inch. The device can also perform multiple print passes by the inkjet cartridge in horizontal and/or vertical manners. The application user interface can launch a home screen indicating "Nailbot for Preemadonna Professional." The images and designs in the galleries and collections can be applicable to the target user and print resolution settings.

In further embodiments, the device (e.g., a nail decorating apparatus such as the device or apparatus 202 as shown in the examples of FIG. 2A-FIG. 2C) can generate notifications indicating the level of ink inside the applicator (e.g., cartridge). The recommendations can for example be based on the mobile application RIP (raster image processing) conversion steps. In another example, the device can push out a reminder or alert to purchase a new applicator (e.g., cartridge) when the ink levels reach a certain level.

Note that in the device (e.g., a nail decorating apparatus such as the device or apparatus 202 as shown in the examples of FIG. 2A-FIG. 2C), the ink is stored in a cartridge and the cartridge can include or an applicator for applying the ink to the physical target to decorate/paint the physical target. One embodiment includes a motor coupled to the applicator where, the motor is operable to actuate the applicator to decorate the physical target.

As such, ink levels of base colors of ink available for decoration are determined, in process 1012. Recommendations of designs to be used to decorate the physical target are generated based on the levels of base colors available for decoration 1014. For example, the device can also generate intelligent recommendations for images being printed based on the ink levels and base colors (CMY) available in the cartridge.

An identification of a design with which to decorate the physical target is received, in process 1016. A size of the physical target is determined, in process 1018. Dimensions of the design are adapted to the size of the physical target, in process 1020. The design having the dimensions that have been adapted is printed on to the physical target, in process 1022. Moreover, content is depicted while printing the design onto the physical target, in process 1024. Data or metrics relating to the content being depicted and data relating to data usage are aggregated, in process 1026. Recommendations to purchase a replacement for the applicator are generated based on the ink levels, in process 1028.

Figure 11:
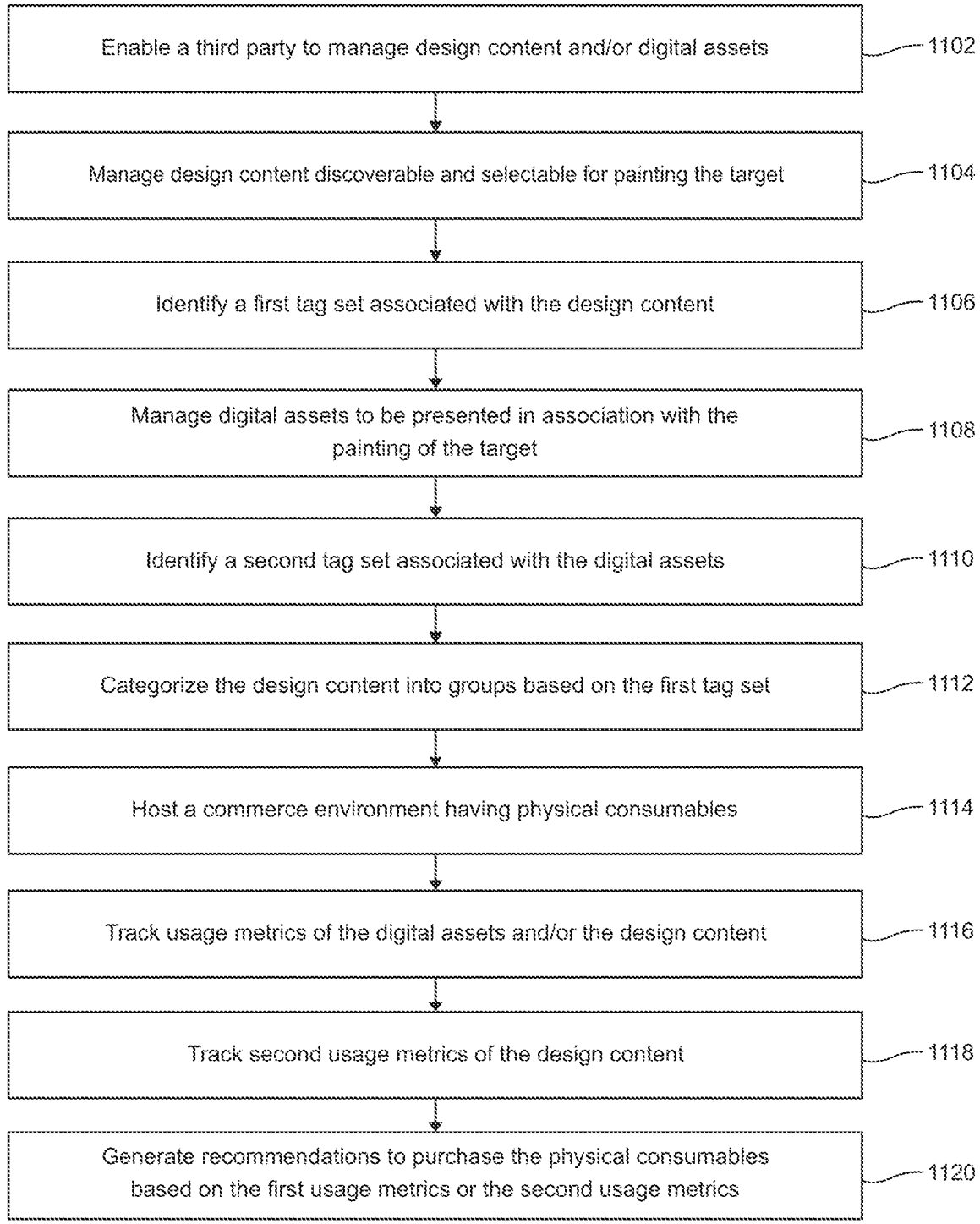
FIG. 11 depicts a flow chart illustrating an example process to host a collaborative beauty platform and/or a commerce environment, in accordance with embodiments of the present disclosure.

FIG. 11 depicts a flow chart illustrating an example process to host a collaborative beauty platform and/or a commerce environment, in accordance with embodiments of the present disclosure.

Embodiments of the present innovation includes ability to review, revise, modify, edit, upload, reorder and/or replace designs or art (e.g., prints etc) as desired (move/add/change/delete) by the host (e.g., the host server 100 of FIG. 1 and/or the host server 300 of FIGS. 3A-3B) and or third parties (e.g., the brand/business who owns or sponsors the art, asset, third party content providers, application developer or publishers).

One embodiment of the present disclosure enables the creation of multiple themes/galleries/groups in the art according to alignment in the campaigns. The art or design collections can include, for example, a range of any number of groups (e.g. 1-n). Example groups can include for instance: by country, by holiday season, by date, by language, etc. Therefore, a third party is enabled to manage design content and/or digital assets, in process 1102. Design content discoverable and selectable for painting the target is managed, in process 1104

Designs or art can be configured to have or be associated with multiple tags. One embodiment includes a parameter associated with the art which specifies, for example, a minimum number of tags, a default number of tags, and/or a maximum number of tags. The number of tags can be offered to clients or content sponsors, and more tags can be offered to paying users, premium users, paying clients, higher tier clients, etc. By way of example but not limitation, the system can support up to 8 tags but offer 4 by default.

A first tag set associated with the design content is identified, in process 1106. Moreover, a parameter can be associated with the first tag set to identify, configure or specify a number of tags that are in the first tag set. Note that in general, the design content can be discoverable and selectable in the groups in a user interface accessible at a device (e.g., a nail decorating apparatus such as the device or apparatus 202 as shown in the examples of FIG. 2A-FIG. 2C) remote from the system where the device is wirelessly coupled to the system (e.g., the host server 100 of FIG. 1 and/or the host server 300 of FIGS. 3A-3B) and is operable to paint the target.

Digital assets (e.g., including interactive content) that can be presented in association with the painting of the target are managed, in process 1108. For example, the device can, depict, render or play the digital assets during discovery process of the design content to paint the physical target, or depict the digital assets during selection process of the art content, and/or depict the digital assets during the painting of the physical target.

In a further embodiment, a second tag set associated with the digital assets is identified, in process 1110. The system (e.g., the host server 100 of FIG. 1 and/or the host server 300 of FIG. 3A-3B) can categorize the design content into groups based on the first tag set, in process 1112. For example, multimedia assets such as audio assets or video assets can be displayed at any point during the art discovery, art selection or printing process, for example, while the device is printing on a nail or other physical target.

Third party content providers or application developers/publishers can configure, reconfigure, upload, organize reorder and replace digital assets s (e.g., video or content) as desired (move/add/change/delete). Embodiments of the present disclosure further enable creation of multiple themes/galleries/groups of the digital assets. The digital assets can be configured or categorized into a range of any number of groups (e.g. 1-n by country, by holiday season, by date, by language, etc.). Note that video assets can also be configured to have multiple tags. One embodiment further includes a parameter associated with the video assets which identifies or specifies a minimum number of tags, a default number of tags, and/or a maximum number of tags. The number of tags offered to third parties including clients, advertisers, publishers or content sponsors may varied.

In a further embodiment, the system (e.g., the host server 100 of FIG. 1 and/or the host server 300 of FIG. 3A-3B) can generate metrics associated with the digital assets or other content—who skips ads, how quickly or frequently they skip, if they interact (swipe/touch/color/doodle based on actual content), content with high engagement level. Metrics on the usage of the digital assets can enable brands or third parties to determine, compute or assess targets, priorities, or reflect on promotion or campaign's return on investment. This data can then be used as the baseline going forward when sponsors or advertisers might want to charge per asset in the future versions of the device (e.g., a nail decorating apparatus such as the device or apparatus 202 as shown in the examples of FIG. 2A-FIG. 2C).

In a further example, the system (e.g., the host server 100 of FIG. 1 and/or the host server 300 of FIG. 3A-3B) can maintain or generate audience data. The system can identify relationships in the data between the users (age/sex/location (grid, country, state, city, town, area code, post code, zip code, etc.), ios/android/brand affinity, the number in the family, etc). This is additional data that can be provided (e.g., on a fee basis) on the user base for monetization purposes.

The system (e.g., the host server 100 of FIG. 1 and/or the host server 300 of FIG. 3A-3B) includes or can further be associated with an e-commerce store that identifies or generates recommendations for users to purchase physical consumables such as applicator replacement (ink), nail polish consumables, nail cosmetic remover wipes. The system aggregates data usage and information on content printing. The system can further use the data usage and/or information on content printing within a device (e.g., a nail decorating apparatus such as the device or apparatus 202 as shown in the examples of FIG. 2A-FIG. 2C) to push alerts and notifications for specific consumables.

These alerts and notifications can be customized to a user based on the type of nail decorating apparatus (e.g., child, junior, toy or salon) identified once the user registers and/or pairs the apparatus with the mobile application. For example, in one embodiment, a device intended for use a professional setting can be associated with a distinct e-commerce store which stocks or carries consumables and goods specific to that user or type segment.

In yet a further embodiment, a commerce environment having physical consumables is hosted, in process 1114. Usage metrics of the digital assets and/or the design content are tracked, in process 1116. In addition, second usage metrics of the design content can be tracked, in process 1118. Furthermore, recommendations to purchase the physical consumables can be generated based on the first usage metrics or the second usage metrics, in process 1120. Metrics on the usage of the assets (views, open, download, print, share) can enable brands or third parties to determine, compute or assess targets, priorities, or reflect in campaign ROI for the partner to spend for using the system as a channel for outreach and targeting can be computed. This data can be used as the baseline going forward when they might want to charge per picture/print/etc in the future versions of the bot.

Figure 12:
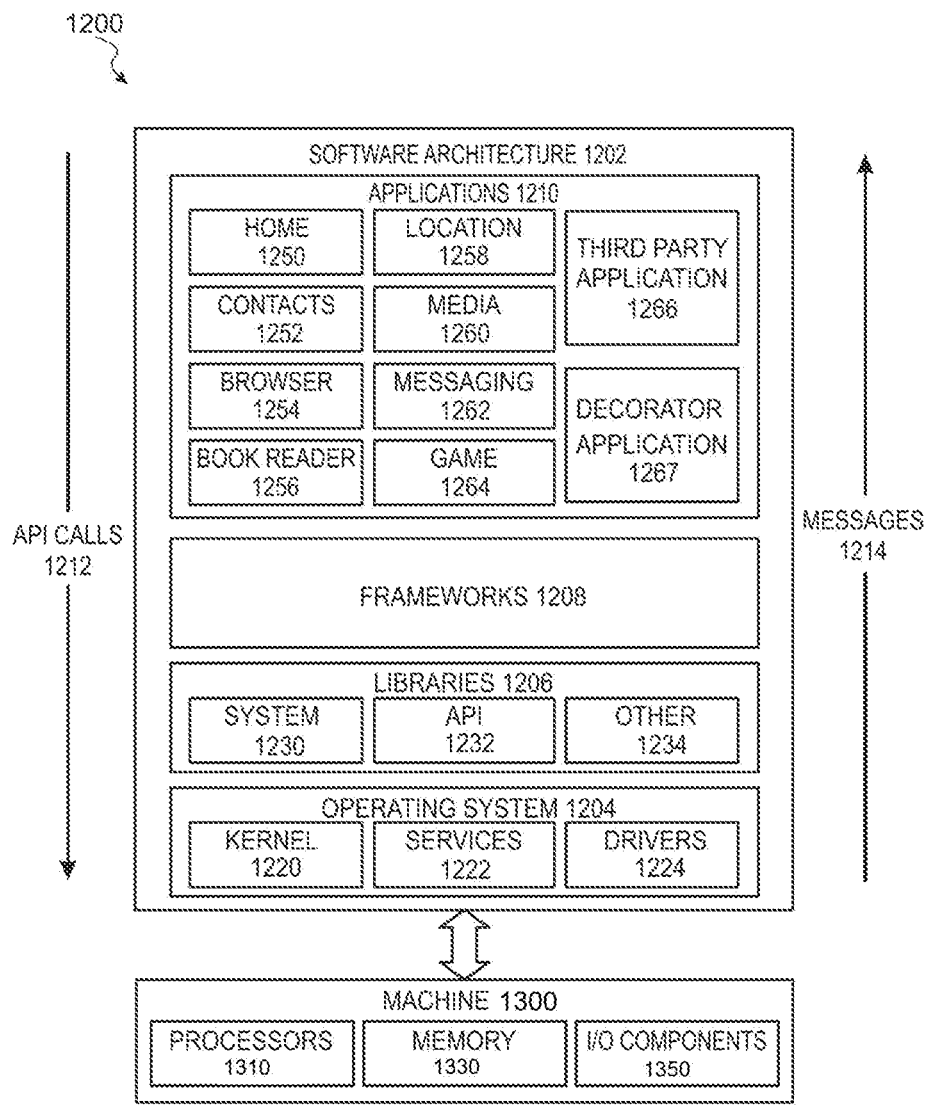
FIG. 12 is a block diagram illustrating an example of a software architecture that may be installed on a machine, in accordance with embodiments of the present disclosure.

FIG. 12 is a block diagram illustrating an example of a software architecture 200 that may be installed on a machine, in accordance with embodiments of the present disclosure.

FIG. 12 is a block diagram 1200 illustrating an architecture of software 1202, which can be installed on any one or more of the devices described above. FIG. 12 is a non-limiting example of a software architecture, and it will be appreciated that many other architectures can be implemented to facilitate the functionality described herein. In various embodiments, the software 1202 is implemented by hardware such as machine 1300 of FIG. 13 that includes processors 1310, memory 1330, and input/output (I/O) components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke API calls 1212 through the software stack and receive messages 1214 in response to the API calls 1212, in accordance with some embodiments.

In some embodiments, the operating system 1204 manages hardware resources and provides common services. The operating system 1204 includes, for example, a kernel 1220, services 1222, and drivers 1224. The kernel 1220 acts as an abstraction layer between the hardware and the other software layers consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH drivers, flash memory drivers, serial communication drivers (e.g., Universal Serial Bus (USB) drivers), WI-FI drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematics functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a search/discovery application 1256, a location application 1258, a media application 1260, a messaging application 1262, a game application 1264, and other applications such as a third party application 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the Android, Windows or iOS. software development kit (SDK) by an entity other than the vendor of the particular platform) may be mobile software running on a mobile operating system such as Android, Windows or iOS, or another mobile operating systems. In this example, the third party application 1266 can invoke the API calls 1212 provided by the operating system 1204 to facilitate functionality described herein.

A decorator application 1267 may implement any system or method described herein, including adaptive nail printing and/or collaborative beauty platform hosting, or any other operation described herein.

Figure 13:
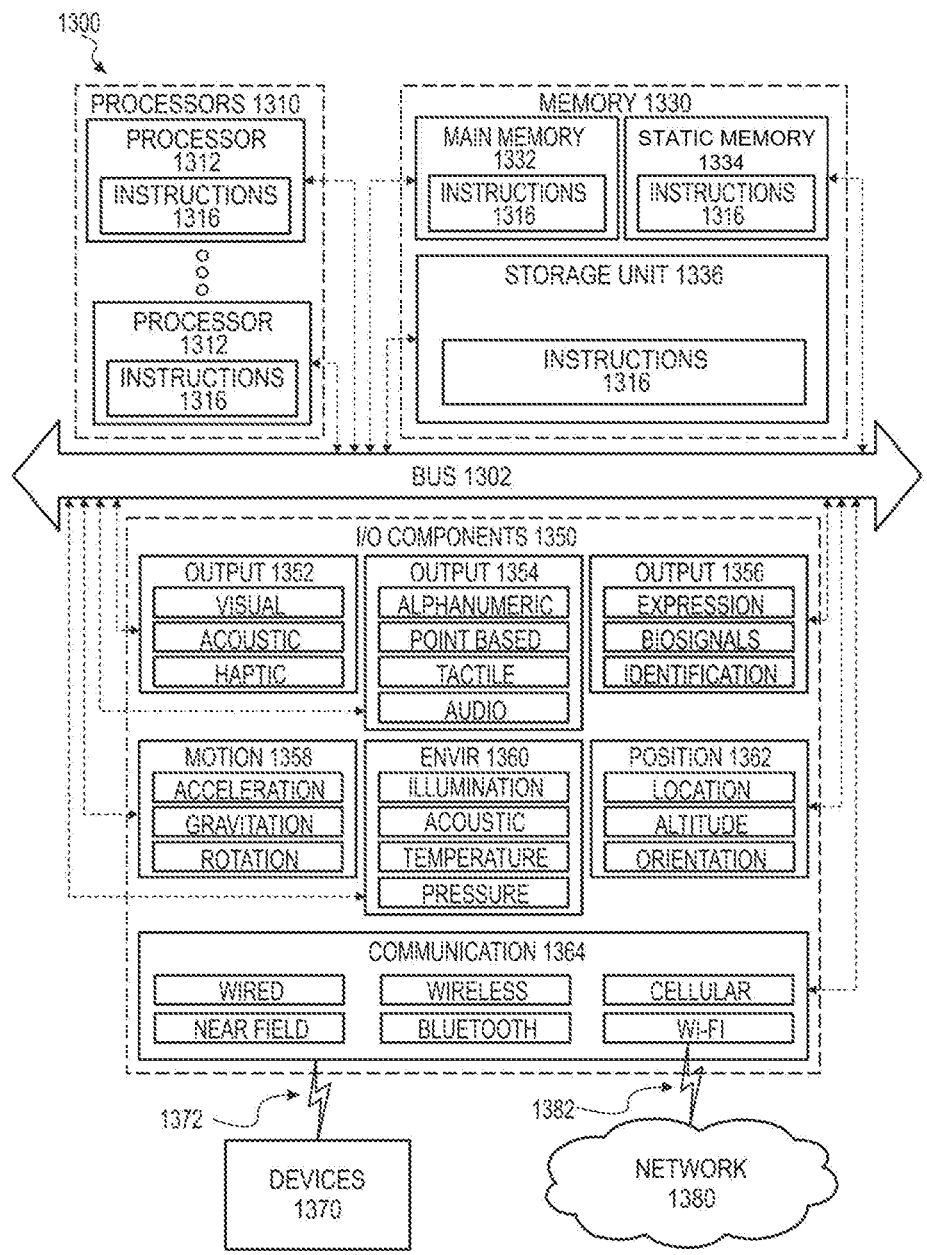
FIG. 13 is a block diagram illustrating components of a machine, according to some example embodiments, able to read a set of instructions from a machine-readable medium (e.g., a machine-readable storage medium) and perform any one or more of the methodologies discussed herein.

FIG. 13 is a block diagram illustrating components of a machine 1300, according to some example embodiments, able to read a set of instructions from a machine-readable medium (e.g., a machine-readable storage medium) and perform any one or more of the methodologies discussed herein.

Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein can be executed. Additionally, or alternatively, the instruction can implement any module of FIG. 3A and any module of FIG. 4A, and so forth. The instructions transform the general, non-programmed machine into a particular machine programmed to carry out the described and illustrated functions in the manner described.

In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a head mounted device, a smart lens, goggles, smart glasses, a smart home device (e.g., a smart appliance), other smart devices, a web appliance, a network router, a network switch, a network bridge, a Blackberry, a processor, a telephone, a web appliance, a console, a hand-held console, a (hand-held) gaming device, a music player, any portable, mobile, hand-held device or any device or machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 can include processors 1310, memory/storage 1330, and I/O components 1350, which can be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1312 and processor 1310 that may execute instructions 1316. The term "processor" is intended to include multi-core processor that may comprise two or more independent processors (sometimes referred to as "cores") that can execute instructions contemporaneously. Although FIG. 13 shows multiple processors, the machine 1300 may include a single processor with a single core, a single processor with multiple cores (e.g., a multi-core processor), multiple processors with a single core, multiple processors with multiples cores, or any combination thereof.

The memory/storage 1330 can include a main memory 1332, a static memory 1334, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 can also reside, completely or partially, within the memory 1332, within the storage unit 1336, within at least one of the processors 1310 (e.g., within the processor's cache memory), or any suitable combination thereof, during execution thereof by the machine 1300.

Accordingly, the memory 1332, the storage unit 1336, and the memory of the processors 1310 are examples of machine-readable media.

As used herein, the term "machine-readable medium" or "machine-readable storage medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" or "machine-readable storage medium" should be taken to include a single medium or multiple media (e.g., a centralized or distributed database, or associated caches and servers) able to store instructions 1216. The term "machine-readable medium" or "machine-readable storage medium" shall also be taken to include any medium, or combination of multiple media, that is capable of storing, encoding or carrying a set of instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" or "machine-readable storage medium" refers to a single storage apparatus or device, as well as "cloud-based" storage systems or storage networks that include multiple storage apparatus or devices. The term "machine-readable medium" or "machine-readable storage medium" excludes signals per se.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The I/O components 1350 can include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 can include many other components that are not shown in FIG. 13. The I/O components 1350 are grouped according to functionality merely for simplifying the following discussion and the grouping is in no way limiting. In example embodiments, the I/O components 1350 can include output components 1352 and input components 1354. The output components 1352 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), eye trackers, and the like.

In further example embodiments, the I/O components 1352 can include biometric components 1356, motion components 1358, environmental components 1360, or position components 1362 among a wide array of other components. For example, the biometric components 1356 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 can include acceleration sensor components (e.g., an accelerometer), gravitation sensor components, rotation sensor components (e.g., a gyroscope), and so forth. The environmental components 1360 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or other suitable device to interface with the network 1380. In further examples, communication components 1364 include wired communication components, wireless communication components, cellular communication components, Near Field Communication (NFC) components, Bluetooth. components (e.g., Bluetooth. Low Energy), WI-FI components, and other communication components to provide communication via other modalities. The devices 1370 may be another machine or any of a wide variety of peripheral devices (e.g., a peripheral device coupled via a USB).

The network interface component can include one or more of a network adapter card, a wireless network interface card, a router, an access point, a wireless router, a switch, a multilayer switch, a protocol converter, a gateway, a bridge, bridge router, a hub, a digital media receiver, and/or a repeater.

The network interface component can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Moreover, the communication components 1364 can detect identifiers or include components operable to detect identifiers. For example, the communication components 1364 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI signal triangulation, location via detecting a BLUETOOTH or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or other type of cellular or wireless coupling. In this example, the coupling 1382 can implement any of a variety of types of data transfer technology, such as Single Carrier Radio Transmission Technology, Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, 5G, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 can be transmitted or received over the network 1380 using a transmission medium via a network interface device (e.g., a network interface component included in the communication components 1364) and utilizing any one of a number of transfer protocols (e.g., HTTP). Similarly, the instructions 1316 can be transmitted or received using a transmission medium via the coupling 1372 (e.g., a peer-to-peer coupling) to devices 1370. The term "transmission medium" shall be taken to include any intangible medium that is capable of storing, encoding, or carrying the instructions 1316 for execution by the machine 1300, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the innovative subject matter has been described with reference to specific example embodiments, various modifications and changes may be made to these embodiments without departing from the broader scope of embodiments of the present disclosure. Such embodiments of the novel subject matter may be referred to herein, individually or collectively, by the term "innovation" merely for convenience and without intending to voluntarily limit the scope of this application to any single disclosure or novel or innovative concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A system to decorate a nail, the system comprising:
   a host server to facilitate decoration of the nail over a network;
   a portable printing device communicatively coupled to the host server over the network, the portable printing device having an applicator unit to apply color to decorate the nail;
   a motor coupled to the applicator unit;
   wherein, the motor is operable to actuate the applicator to decorate the nail;
   a finger cradle disposed in an opening of the portable printing device;
   wherein, the finger cradle guides placement of a finger of the nail to be decorated in the portable printing device;
   a retractable external device holder formed in the portable printing device;
   wherein, the retractable external device holder is operable to be retracted into the portable printing device and protracted from the portable printing device;
   wherein, the nail is able to be decorated by the portable printing device when the retractable external device holder is retracted into the portable printing device;
   wherein, the portable printing device further comprises:
   a processing unit:
   a memory unit having stored thereon instructions which when executed by the processing unit, cause the processing unit to:

print the design onto the physical target in a single print pass responsive to determining that the size of the nail is of a first size range;

print the design onto the physical target in multiple print passes responsive to determining that the size of the nail is of a second size range;

wherein, the second size range is larger than the first size range;

wherein, the nail is also able to be decorated by the portable printing device when the retractable external device holder is protracted from the portable printing device;

wherein, the retractable device holder is able to hold a mobile phone when protracted from the portable printing device;

wherein, the mobile phone further comprises:

an internal camera of the mobile phone;

a processing unit:

a memory unit having stored thereon instructions which when executed by the processing unit, cause the processing unit to:

depict interactive content during discovery process and during selection process of a design with which to decorate the nail;

receive a selection of the design with which to decorate the nail;

wherein, the interactive content is also depicted while the design is being used to decorate the nail.

2. The system of claim 1, further comprising, an optical system internal to the portable printing device;

wherein, the optical system is operable to detect the nail or the finger of the nail to be decorated.

3. The system of claim 1, wherein, the instructions which when executed by the processing unit, further cause the processing unit to:

identify registration information of the portable printing device;

based on a user type or membership tier indicated in the registration information, configure the portable printing device with a default resolution with which to use to decorate the nail;

decorate the nail using the default resolution;

when the registration information indicates a young user or a lower membership tier, the default resolution with which the portable printing device is configured is of a first resolution;

when the registration information indicates an adult user or a premium membership tier, the default resolution with which the portable printing device is configured is of a second resolution;

wherein, the second resolution is higher than the first resolution.

4. The system of claim 3, further comprising, an optical system internal to the portable printing device;

wherein, the optical system is operable for imaging in the decoration of the nail;

when the registration information indicates a young user or a lower membership tier, the default resolution with which the portable printing device is configured is of the first resolution;

wherein, the nail is decorated at the first resolution in a single print pass of the applicator;

further wherein, the optical system internal to the portable printing device is kept inactive in the decoration of the nail;

further wherein, the internal camera of the mobile phone is also not used for imaging in the decoration of the nail.

5. The system of claim 3, further comprising, an optical system internal to the portable printing device;

wherein, the optical system is operable for imaging in the decoration of the nail;

when the registration information indicates an adult user or a premium membership tier, the default resolution with which the portable printing device is configured is of the second resolution;

wherein, the nail is decorated at the second resolution in multiple print passes of the applicator;

further wherein, one or more of the optical system internal to the portable printing device and the internal camera of the mobile phone coupled to the portable printing device are activated for imaging in the decoration of the nail.

6. The system of claim 3, wherein, the first resolution is of a range of 150 to 600 dots per inch;

wherein, the second resolution is of a range of 600 to 3000 dots per inch.

7. The system of claim 1, wherein, the host server administers design content from which the design to decorate the nail is selected;

wherein, the host server further hosts the interactive content that is depicted;

wherein, the interactive content includes video advertisements or interactive entertainment.

8. The system of claim 1, wherein, the portable printing device further comprises an internal voice activation system embedded in the portable printing device.

9. The system of claim 1, further comprising:

an external voice activation device external to the portable printing device and external to the mobile phone;

wherein, in operation, the external voice activation device is wirelessly coupled to the portable printing device for use to control the portable printing device and to facilitate interaction with the interactive content.

10. The system of claim 1, further comprising:

an external voice activation device external to the portable printing device and external to the mobile phone;

wherein, in operation, the external voice activation device is wirelessly coupled to the mobile phone to operate the system.

11. The system of claim 1, wherein, a size of the nail is determined by computing a surface area of the nail, a nail bed size of the nail and a curvature of the nail;

further wherein, dimensions of the design are adapted to the size of the nail for decoration onto the nail.

12. A method to paint a physical target, the method comprising:

printing, by a portable printing device, a design onto a physical target in a single print pass responsive to determining that a size of the physical target is of a first size range;

wherein, the design is printed onto the physical target in multiple print passes responsive to determining that the size of the nail is of a second size range, the second size range being larger than the first size range;

wherein, the portable printing device includes an applicator unit to apply ink to paint the physical target;

wherein, the portable printing device further includes a cradle disposed in an opening of the portable printing device; the cradle to guide placement of the physical target to be painted in the portable printing device;

wherein, the portable printing device further includes a retractable device holder formed in the portable printing device; the retractable device holder being operable to be retracted into the portable printing device and protracted from the portable printing device;

wherein, the physical target is painted when the retractable device holder is retracted into the portable printing device;

wherein, the portable printing device further comprises:
a processing unit:
a memory unit having stored thereon instructions which when executed by the processing unit, cause the processing unit to:
identify registration information the portable printing device for use;
based on a membership tier indicated in the registration information, configure the portable printing device with a default resolution with which to paint the physical target;
paint the physical target with the default resolution.

13. The method of claim 12, further comprising:
depicting, by a mobile device, interactive content during a discovery process or during a selection process of the design with which to use to paint the physical target;
receiving, by the mobile device an identification of the design with which to decorate the physical target;
wherein, the mobile device is held in the retractable device holder when the retractable device holder is protracted from the portable printing device;
wherein, the physical target is also able to be decorated by the portable printing device when the retractable device holder is protracted from the portable printing device;
wherein, the mobile device further comprises
an internal camera.

14. The method of claim 12, further comprising,
facilitating, by a host server, the painting of the physical target by the portable printing device over a network, the host server being communicatively coupled to the portable printing device over a network
administering and storing, by the host server, design content from which a design to be used to paint the physical target is selected;
administering, by the host server, an e-commerce environment accessible via the portable printing device over the network;
wherein, the e-commerce environment provides physical consumables for the painting of the physical target for sale;
tracking, by the host server first usage metrics of the design content and second usage metrics of the interactive content;
generating, by the host server, recommendations to purchase the physical consumables based on the first usage metrics or the second usage metrics.

15. The method of claim 12,
wherein, the physical target includes a nail including one or more of, a fingernail or a toenail;
wherein, a size of the nail is determined by computing one or more of, a surface area of the nail, a nail bed size of the nail and a curvature of the nail;
further wherein, dimensions of the design are adapted to the size of the nail;

wherein, the design is printed onto the nail in a single print pass when the size of the nail is of a first size range,
wherein, the design is printed onto the nail in multiple print passes when the size of the nail is of a second size range,
wherein, the second size range is larger than the first size range.

16. The method of claim 12, further comprising,
imaging the physical target to be decorated by an optical system coupled to the portable printing device;
when the registration information indicates a first membership tier, the optical system is kept inactive in the painting of the physical target;
when the registration information indicates a second membership tier, the optical system is activated for imaging in the painting of the physical target.

17. The method of claim 12, further comprising:
receiving by, an external voice activation device, voice commands to control the portable printing device and to facilitate interaction with the interactive content
wherein, the external voice activation device is external to the portable printing device;
wherein, in operation, the external voice activation device is coupled to the portable printing device to process the voice commands;
wherein, the external voice activation unit includes a smarthub to control multiple smart home applications.

18. A method to decorate a nail, the method comprising:
detecting, by a device, the nail or the finger of the nail to be decorated;
determining a size of the nail is determined by computing one or more of, a surface area of the nail, a nail bed size of the nail and a curvature of the nail;
adapting dimensions of a design to be used to decorate the nail to the size of the nail;
applying ink to decorate the nail by an applicator unit of the device;
wherein, the device includes a finger guide disposed in an opening of the device, the finger guide orients placement of a finger of the nail to be decorated in the device;
wherein, the device includes a retractable device holder formed in the device, the retractable device holder is operable to be retracted into the device and protracted from the device;
wherein, the device is operable to decorate the nail when the retractable device holder is retracted into the device;
wherein, the device is also operable to decorate the nail when the retractable device holder is protracted from the device.

19. The method of claim 18, further comprising, superimpose a design rendering of a design over a rendering of the nail to generate a simulated view of the nail decorated with design.

20. The method of claim 19, further comprising:
receiving, a selection of the design;
decorating the nail with the design;
creating a video of the design being decorated onto the nail by an internal camera of an external device,
wherein, the external device is held by the retractable device holder when protracted from the portable printing device.

* * * * *